US008631431B2

(12) United States Patent
Berberet et al.

(10) Patent No.: US 8,631,431 B2
(45) Date of Patent: Jan. 14, 2014

(54) METHOD AND SYSTEM FOR PROVIDING PREVIOUSLY RECORDED BROADCAST PROGRAMMING WITH SUBSTITUTE COMMERCIALS

(75) Inventors: Suzanne M. Berberet, Sheboygan, WI (US); William Glad, Sheboygan, WI (US)

(73) Assignee: Time Warner Cable Enterprises LLC, New York, NY (US)

( * ) Notice: Subject to any disclaimer, the term of this patent is extended or adjusted under 35 U.S.C. 154(b) by 86 days.

(21) Appl. No.: 13/093,594

(22) Filed: Apr. 25, 2011

(65) Prior Publication Data

US 2012/0159539 A1  Jun. 21, 2012

Related U.S. Application Data

(63) Continuation of application No. 10/182,307, filed as application No. PCT/US01/01833 on Jan. 19, 2001.

(60) Provisional application No. 60/238,258, filed on Oct. 5, 2000, provisional application No. 60/177,714, filed on Jan. 27, 2000.

(51) Int. Cl.
*H04N 7/173* (2011.01)
*H04N 5/445* (2011.01)
*H04N 21/458* (2011.01)

(52) U.S. Cl.
USPC .................................. 725/32; 725/42; 725/88

(58) Field of Classification Search
USPC .................................. 725/42, 88, 102, 32–36
See application file for complete search history.

(56) References Cited

U.S. PATENT DOCUMENTS

| 5,751,282 | A  | * | 5/1998  | Girard et al. ................... 715/721 |
| 5,892,535 | A  | * | 4/1999  | Allen et al. ...................... 725/36 |
| 5,892,915 | A  | * | 4/1999  | Duso et al. ..................... 709/219 |
| 6,588,015 | B1 | * | 7/2003  | Eyer et al. ........................ 725/89 |
| 6,598,228 | B2 | * | 7/2003  | Hejna, Jr. ......................... 725/91 |
| 6,671,879 | B1 | * | 12/2003 | Schlarb et al. ..................... 725/8 |
| 6,920,565 | B2 | * | 7/2005  | Isaacson et al. .............. 713/193 |
| 2001/0054181 | A1 | * | 12/2001 | Corvin ............................ 725/42 |
| 2008/0195871 | A1 | * | 8/2008  | Peinado et al. ............... 713/189 |

* cited by examiner

*Primary Examiner* — Pankaj Kumar
*Assistant Examiner* — Reuben M Brown
(74) *Attorney, Agent, or Firm* — Antonio Papageorgiou; Ostrow Kaufman LLP

(57) ABSTRACT

A system is disclosed for providing broadcast programming to subscriber locations including an intermediate video supplier, subscriber location equipment and one or more video sources. The intermediate video supplier includes a video buffer and a video server that processes received subscriber requests and retrieves, according to the subscriber requests, either of currently broadcast programming or broadcast programming previously buffered in the video buffer by the video server. The subscriber location equipment includes a remote control and a local control unit that transmits the subscriber requests to the video server via one or more data links and receives, from the video server, the broadcast programming for display on a local video display via the data link. A subscriber may initiate a restart command with a single action via the remote control to restart a currently viewed program from the beginning even if the currently viewed program was joined in progress.

42 Claims, 11 Drawing Sheets

DIGITAL OR ANALOG BROADCAST MODEL

DIGITAL OR ANALOG BROADCAST MODEL
WITH LOCAL VIDEO BUFFER

ANALOG/DIGITAL BROADCAST MODEL (Detail View)

METHOD AND SYSTEM FOR PROVIDING PREVIOUSLY RECORDED BROADCAST PROGRAMMING WITH SUBSTITUTE COMMERCIALS

CLAIM OF PRIORITY

This application is a continuation of and claims priority to U.S. Ser. No. 10/182,307, filed Jul. 26, 2002, which is a National Phase application of PCT/US01/01833, filed on Jan. 19, 2011, which claims priority to provisional application entitled "Method And Apparatus For Providing Programs, A Virtual VCR, And A Video Scrapbook To Cable, Direct TV, Internet And Other Intermediate Video Source Subscribers" filed in the U.S. Patent and Trademark Office on Jan. 27, 2000 and assigned Ser. No. 60/177,714, and to provisional application entitled "Method, System And Apparatus For Providing Television Programs, A Virtual VCR, And A video Scrapbook To Subscribers Of Cable TV, Satellite TV And Other Intermediate Video Suppliers, And To Users Of The Global Computer Information Network" filed in the U.S. Patent and Trademark Office on Oct. 5, 2000 and assigned Ser. No. 60/238,258, the entire contents of each of these applications are hereby incorporated by reference.

BACKGROUND OF THE INVENTION

1. Field of the Invention

The present invention relates to a system for the distribution, viewing and recording of broadcast programming, and more specifically, to a method and apparatus for facilitating the viewing and recording of television programs and parts of programs by subscribers to Cable TV, Satellite TV, sites on the Global Computer Information Network and other intermediate video suppliers.

2. Description of Related Art

There are 11,000 CATV systems in the United States, serving about 64 million homes. Worldwide, CATV passes 200 million homes and Satellite TV passes over a billion homes. CATV now delivers up to 78 channels and may deliver as many as 360 broadcast channels in the future. Satellite TV delivers up to 200 channels over the air.

Both CATV and Satellite TV systems send all channels to every subscriber simultaneously. Channel selection occurs within a television, VCR or set-top box, located in the home. CATV and Satellite TV systems function as extensions of their subscribers' television sets. CATV and Satellite TV systems are designed to support broadcast television, and the main feature of broadcast television is that its programming is scheduled and transmitted at a predetermined time.

Many inconveniences arise in the viewing of broadcast television programs from CATV, Satellite TV and other intermediate video source providers. Because broadcast programs are provided according to a schedule, viewers often miss programs, either because they are not able to watch programs at the scheduled time, or because of equipment failure at their home site, at the intermediate video provider's site or on the network that connects their homes to the provider. The current state of the art of CATV and Satellite TV systems does not allow viewers to watch programs on the viewers' own schedules.

Other systems have been proposed to add convenience for subscribers, however they subject a subscriber to unnecessarily complicated procedures to perform limited functions. For example, in published International Application Number WO 99/63759, a system is disclosed wherein a subscriber is required to navigate through an interactive electronic program guide. In that disclosure a subscriber may only access recorded programming that is previously recorded in its entirety. A subscriber viewing a broadcast program from some middle point as it is initially aired may not view the program from the beginning until the program has aired in its entirety. Even then, the subscriber is required to inconveniently navigate a complicated menu structure to locate the desired program.

Another inconvenience arises from the fact that users of VCRs and digital VCRs can only record one channel at a time.

A further inconvenience arises from the fact that viewers are not able to access programming that is being broadcast in other geographic areas.

Another inconvenience arises from the fact that there is no readily accessible central repository of all programming that has been broadcast in all geographies over a given time period.

A further inconvenience arises from the fact that both CATV and Satellite TV systems send all channels to every subscriber simultaneously, and that channel selection occurs within a television, VCR or set-top box, located in the home. Intermediate video suppliers are exposed to the risk of lost revenue when subscribers use "de-scramblers" and other devices to de-multiplex, decode, and view premium channels or pay-per-view programs without paying for them.

Yet another inconvenience arises from the fact that intermediate video suppliers, networks and copyright owners are exposed to the risk of lost revenue when VCR and digital VCR users copy and replay programs without compensating the copyright owners.

Another inconvenience arises from the fact that broadcasters are exposed to the risk of lost revenue when video-on-demand, VCRs, digital VCRs and other technology significantly reduce viewers' exposure to advertising by making it possible for users of the technology to skip or fast forward through commercials.

Therefore, a need exists for a method and apparatus that facilitates the viewing and recording of broadcast programming to overcome the aforementioned deficiencies of the prior art.

SUMMARY OF THE INVENTION

One primary advantage of the present invention is that it allows television viewers to come into the middle of any program and to still view or record it from the beginning.

The invention also allows viewers to decide whether or not to record any program or part of a program after they have viewed it. It is even possible to view and/or record previously broadcast programming. Subscribers to the service can go back in time to view and/or record programming they otherwise might have missed. And, while they are watching a program on one channel, subscribers can record programs from as many other channels as they want at the same time.

Unlike current technology, it is not necessary for the viewer to know what he or she wants to view or record in advance. The present invention allows viewers to browse or "surf" all of the channels they subscribe to in order to find programs of interest. When the viewer finds an interesting program, he or she can restart the program from its beginning and watch and/or record the entire program, even though they originally joined it "in progress." Thus, the programming in progress at a given time becomes a living "menu" that subscribers can select programs from to restart and watch in their entirety. Unlike alternatives such as Video-On-Demand, VCRs, digital-VCRs and Interactive TV, the present invention is ideally suited to the viewing habits of television viewers who prefer to have their viewing options presented as scheduled broadcasts that they can sample in order to decide what to watch.

A particularly advantageous feature of the present invention is a virtual VCR, provided by the INTERMEDIATE VIDEO SUPPLIER, which provides subscribers to the service with all of the features of a VCR without their having to purchase or maintain a physical VCR apparatus.

Another feature of the present invention is a Subscriber Video Scrapbook that allows subscribers to store recorded and edited video in a centralized video database, provided by the INTERMEDIATE VIDEO SUPPLIER, instead of on storage devices in the home.

Yet another feature of the present invention is a Video Scrapbook Index that allows INTERMEDIATE VIDEO SUPPLIERS to minimize video storage requirements by storing subscriber recordings as pointers to frames in a single copy of a program, instead of storing the actual frames of video.

In one aspect, the present invention provides a method for determining which copyright owners have agreed to allow subscribers to restart, replay, record and otherwise reuse their content.

In another aspect of the present invention a method is provided for inserting additional or replacement commercials into the broadcast when the viewer restarts or replays programs, fast forwards through commercials, and at other points in the broadcast.

It is therefore an object of the present invention to provide a method and system for providing broadcast programming to subscribers.

It is another object of the present invention to allow the subscribers to go back in time and view or record any programming they missed or joined in progress.

It is a further object of the invention to allow subscribers to go back in time and replay or record parts of programs they find interesting.

It is yet another object of the present invention to store programming from Video Sources at INTERMEDIATE VIDEO SUPPLIERS so that subscribers can access the programs in their entirety at any time.

Another object of the present invention is to allow subscribers to the service to have their viewing options presented as scheduled broadcasts that they can sample in order to decide what to watch.

A further object of the present invention is to allow subscribers to create their own viewing and recording schedule, independent of the INTERMEDIATE VIDEO SUPPLIER'S or other Video Source's broadcasting schedules.

It is yet another object of the present invention to allow subscribers to store video recordings in a common database maintained by a CATV station, Satellite TV station, Global Computer Information Network site or other INTERMEDIATE VIDEO SUPPLIER.

A still further object of the present invention is to minimize video storage requirements by storing subscriber video recordings as a sequence of pointers to the frames in a single copy of a program, instead of storing copies of the frames themselves.

Another object of the present invention is to allow subscribers to record as many channels as they want to at the same time.

Yet another object of the present invention is to provide subscribers with the functionality of a VCR without requiring them to purchase or maintain a physical VCR.

Another object of the present invention is to record programming from multiple sources in a Video Buffer at CATV stations, Satellite TV stations, or other INTERMEDIATE VIDEO SUPPLIER sites instead of requiring subscribers to record the programs on home VCRs or Personal TV devices.

It is yet another object of the present invention to provide subscribers with a Local Video Buffer that can be used in conjunction with or in place of the Video Buffer at the INTERMEDIATE VIDEO SUPPLIER site to record programming from multiple sources.

A further object of the present invention is to connect systems in different geographies so that subscribers have access to the programming that was broadcast in other geographies as well as in their own.

Yet another object of the present invention is to archive and index programs from the Video Buffer and the Local Video Buffer in order to create a searchable database of all programs broadcast in all geographies over a given period of time.

A further object of the present invention is to be independent of any particular hardware, database management and system software, programming language, network or video distribution system.

Another object of the present invention is to create individual channels for subscribers within the program channels normally delivered to the home by further dividing the multiplexed signal that is delivered to the home. By subdividing the multiplexed signal further, either by shortening the time interval for time-division multiplexing or by using a combination of time and frequency division multiplexing, an individual version of each channel can be created for each subscriber.

It is a further object of the present invention to be independent of any particular home computer, television, VCR, or technology for interaction with CATV stations, Satellite TV stations, Global Computer Information Network sites or other INTERMEDIATE VIDEO SUPPLIERS.

Yet another object of the present invention is to allow subscribers to continue to use their VCRs as output devices if they want a physical copy of the programming they have previously recorded.

A further object of the present invention is to keep track of the programs subscribers are watching in order to determine the amount of any royalty payments that may be owed to content providers.

It is a further object of the invention to determine which content providers and copyright holders have agreed to allow subscribers to RESTART, REPLAY or RECORD their programs, or to otherwise reuse their content.

It is a further object of the present invention to allow intermediate video suppliers to insert advertising at the beginning of the broadcast when subscribers RESTART or REPLAY a program, to insert replacement commercials when subscribers fast forward through commercials, and to insert additional commercials at other points in the program as well.

To achieve these and other objects, advantages and features in accordance with the purposes of the invention, as embodied and broadly described herein, one aspect of the invention includes a method and apparatus for storing programs from multiple Video Sources in a Video Buffer as they are received at CATV and Satellite TV stations, Global Computer Information Network sites or other INTERMEDIATE VIDEO SUPPLIERS, so the programs can be accessed in their entirety by any subscriber at any time.

In a further aspect, the Video Buffer is capable of storing all of the programming broadcast by THE INTERMEDIATE VIDEO SUPPLIER over a period of time, making it possible for subscribers to construct their own viewing schedule.

In another aspect, the invention includes a method and apparatus that allows a Video Server at the CATV and Satellite TV stations or other INTERMEDIATE VIDEO SUPPLIERS to send the programming directly to the subscriber as it is being stored in the Video Buffer or to send it from the Video Buffer.

In another aspect, the invention includes a method and system that allows the Video Server at the CATV and Satellite TV stations or other INTERMEDIATE VIDEO SUPPLIERS to switch between the Video Buffer and a direct feed at will.

In another aspect, the invention includes a method and system for storing programs from multiple Video Sources in a Local Video Buffer as they are received at the subscriber's home, so the subscriber can access the programs in their entirety at any time.

In a further aspect, the Local Video Buffer is capable of storing all of the programming broadcast by the INTERMEDIATE VIDEO SUPPLIER over a period of time, or substantial parts of that programming, making it possible for subscribers to construct their own viewing schedule.

In another aspect, the present invention includes a method and system for subdividing the signal delivered to each subscriber's home so that each subscriber is able to view an individual version of each channel offered by the INTERMEDIATE VIDEO SUPPLIER.

In another aspect, the present invention includes a method and system that allows a Local Control Unit at the subscriber's location to send the programming directly to the subscriber's video display as it is being stored in the Local Video Buffer or to send it from the Local Video Buffer.

In another aspect, the present invention includes a method and system that allows the Local Control Unit to switch between the Local Video Buffer and a direct feed at will.

In a further aspect, the present invention includes a method for allowing subscribers to view the entire broadcast schedule of both previously broadcast and upcoming programs.

In a further aspect, the present invention includes a method for subscribers to REPLAY programs that have aired previously and to view and record them in their entirety.

In a further aspect, the present invention includes a method for subscribers to SCHEDULE recording sessions in advance and automatically RECORD programs when they are broadcast.

In a further aspect, the present invention includes a method for subscribers to RESTART programs they have joined in progress and to view and record them in their entirety.

In a further aspect, the present invention includes a method for subscribers to RESTART, view and record programs or segments of programs after they have viewed them.

In a further aspect, the present invention includes a method for subscribers to RECORD, PAUSE, REVERSE, FAST FORWARD, SLOW MOTION, and STEP through programs that are in progress.

In a further aspect, the present invention includes a method for subscribers to play selected segments of recorded programs at varying speeds, including SLOW MOTION.

In a further aspect, the present invention includes a method for subscribers to FAST FORWARD from point to point within a program that has completed, and to FAST FORWARD from point to point up to the current moment for programs that are in progress. For programs that are already stored in their entirety in the CATV, Satellite TV or other INTERMEDIATE VIDEO SUPPLIER'S Video Buffer because they were broadcast earlier, it is actually possible to FAST FORWARD through the entire program.

In a further aspect, the present invention includes a method and system for subscribers to RECORD and STORE selected programs or parts of programs in a common database, i.e. Subscriber Video Scrapbook, located at the CATV or Satellite TV or other INTERMEDIATE VIDEO SUPPLIER'S facility. Subscribers may record material from as many channels at the same time as they want to.

In a further aspect, the present invention includes a method and apparatus for subscribers to EDIT video stored in the Subscriber Video Scrapbook, located at the CATV or Satellite TV or other INTERMEDIATE VIDEO SUPPLIER'S facility.

In a further aspect, the present invention includes a method and apparatus for subscribers to store and manipulate indexes and pointers into the Video Buffer or Local Video Buffer instead or storing and manipulating data in the Subscriber Video Scrapbook in order to save storage space. If the programs are still available in the Video Buffer or Local Video Buffer, the subscriber can create and manipulate pointers and indexes into the programs that will provide all of the VCR-like functions that the subscriber would have if he or she actually recorded the programs in their Subscriber Video Scrapbook. Only when the program is finally deleted from the Video Buffer and Local Video Buffer will it be necessary to make a physical copy of the edited version of the program in the Subscriber Video Scrapbook.

In a further aspect, the present invention includes a method for subscribers to make a tape, CD, or other physical COPY of video stored in the Subscriber Video Scrapbook.

In a further aspect, the present invention includes a method for VIDEO SUPPLIERS and content owners to allow subscribers to the service to RESTART or REPLAY original programming.

In a further aspect, the present invention includes a method for VIDEO SUPPLIERS and content owners to allow subscribers to the Subscriber Video Scrapbook feature to make copies of original programming for their personal use.

In a further aspect the present invention includes a method for determining which copyright holders have agreed to let subscribers RESTART, REPLAY, RECORD or otherwise reuse their content.

In a further aspect, the present invention includes a system for connecting multiple INTERMEDIATE VIDEO SUPPLIERS with one another so that subscribers to one system have access to the programming of other systems.

In a further aspect, the present invention includes a system for archiving and indexing programs from the Video Buffers of all systems to create a searchable archive of all programs broadcast by all systems over a specified period of time.

In a further aspect, the present invention includes a method for setting up and maintaining customer accounts and for billing customers for Subscriber Video Scrapbook and other services.

In a further aspect, the present invention includes a method for determining and paying the royalty payments owed to content owners.

In a further aspect, the present invention includes a method for inserting advertising at the beginning of the broadcast when subscribers RESTART or REPLAY a program and for inserting advertisements at other points in the program, including inserting a short replacement commercial when subscribers fast forward through commercials.

BRIEF DESCRIPTION OF THE DRAWINGS

The above and other objects, aspects, features and advantages of the present invention will become more apparent in light of the following detailed description of an exemplary embodiment thereof taken in conjunction with the attached drawings in which.

DETAILED DESCRIPTION OF THE PREFERRED EMBODIMENTS

Figure 1:
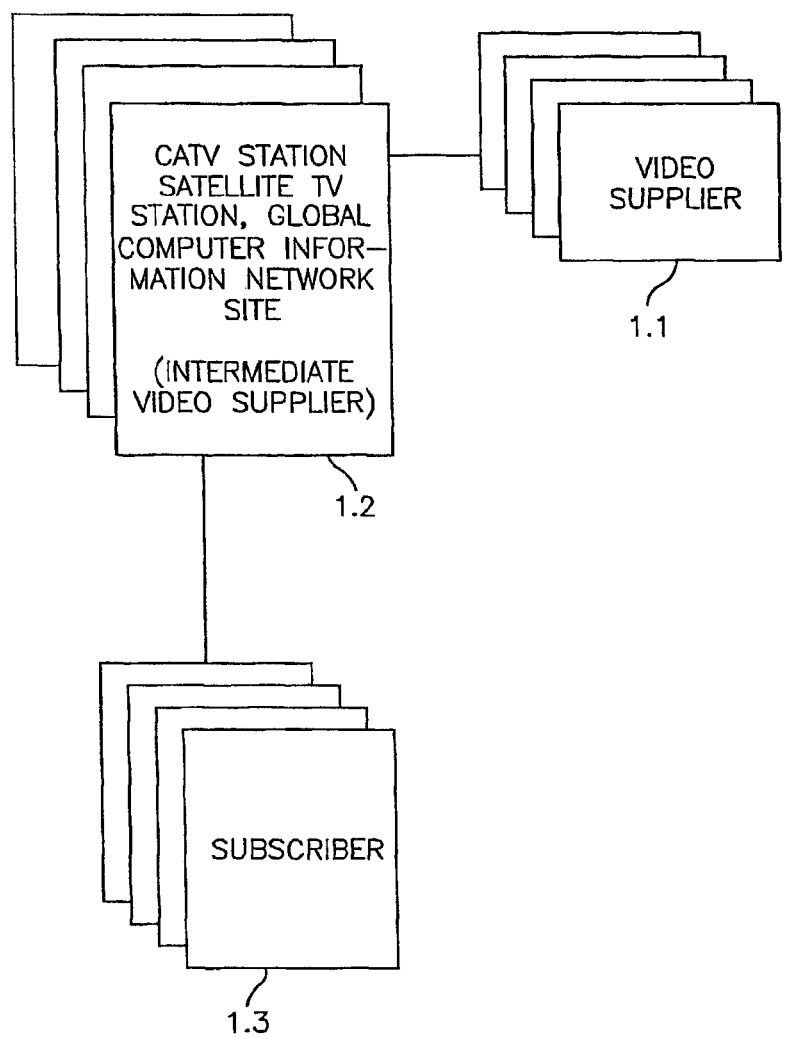
FIG. 1 is a block diagram, which illustrates one embodiment of a system for providing programs, a virtual VCR, and video storage to CATV station, Satellite TV station, Global Computer Information Network site and other INTERMEDIATE VIDEO SUPPLIER to subscribers in accordance with the present invention.

Preferred embodiments of the present invention will be described hereinbelow with reference to the accompanying drawings. In the following description, well-known functions or constructions are not described in detail to avoid obscuring the invention in unnecessary detail.

Before describing the present invention in detail with reference to the figures, it is helpful to briefly describe an overview of the present invention to illustrate the inherent advantages over the prior art.

The system of the present invention avoids the inconveniences of the prior art systems for viewing and recording television programs and radically alters and improves a subscriber's television viewing experience. The system integrates a Video Server and a Video Buffer that stores video from multiple Video Sources as it is received at CATV and Satellite TV stations or other INTERMEDIATE VIDEO SUPPLIERS with a VIRTUAL VCR and personal video storage, i.e., a Subscriber Video Scrapbook, provided as a service to subscribers.

The CATV station, Satellite TV station or other INTERMEDIATE VIDEO SUPPLIER records all of it's programming in a Video Buffer as it receives and transmits the programming to subscribers, and immediately makes the recorded version available to subscribers on demand through a Video Server. The Video Server can transmit the direct feed from video sources to the subscriber or transmit from the Video Buffer interchangeably. The system may optionally include a Local Video Buffer in the Local Control Unit that may be used in conjunction with or in place of the Video Buffer at the INTERMEDIATE VIDEO SUPPLIER. The subscriber is able to perform all of the operations on the recorded version of the programming from the Video Buffer or Local Video Buffer that he or she would be able to perform using a VCR.

In addition, the subscriber is able to record and save programs and parts of programs in a personal Subscriber Video Scrapbook, and to later edit them or transfer them to tape or other physical media. Subscribers can record material from as many different channels at the same time as they desire. In order to minimize video storage requirements, the system is able to store subscriber recordings in the form of pointers to frames of video in a single copy of a program instead of storing actual copies of the frames of video themselves. The system also optionally connects multiple intermediate Video Sources with one another, so that subscribers to one service can view the programming broadcast by other services in different geographies. The system may also include a searchable archive of programs that were broadcast by all INTERMEDIATE VIDEO SUPPLIERS participating in the system.

The system can determine which copyright holders have agreed to allow subscribers to RESTART, REPLAY, RECORD or otherwise reuse their material and it may limit those activities to content covered by appropriate reuse agreements.

INTERMEDIATE VIDEO SUPPLIERS are able to insert commercials when subscribers RESTART or REPLAY programs. They can also insert short, substitute commercials when subscribers FAST FORWARD through commercials, or they can charge a premium for that feature or disable that feature the first time a program is viewed. Some examples of the kinds of activities the invention facilitates, include:

A subscriber may come into any program in the middle and restart it from the beginning with a single touch.

A subscriber may view and record a program that was broadcast the day before.

A subscriber may schedule the recording of an upcoming program.

A sports fan, watching the World Series, may make their own highlights video of the game.

A subscriber who likes to cook may watch a cooking show and, at its end, decide whether it is worth recording.

Parents may watch a program and, at its end, decide whether or not to record it for their children.

An assistant to a public figure may watch a news program and, once a pertinent segment has aired, choose to archive it.

Children may keep "scraps" of spectacular TV moments (building demolitions or clips from their favorite shows) to show their friends.

A subscriber watching TV may pause the program to take a phone call or eat dinner and, upon their return, watch the remainder of their program.

A subscriber may record and save in their Subscriber Video Scrapbook any number of programs or parts of programs from any number of channels at the same time.

A subscriber may view and record programs broadcast by other INTERMEDIATE VIDEO SUPPLIERS participating in the system, even if the sources are in another geography.

A subscriber may search and retrieve programs and parts of programs from an archived database of the programs that have been broadcast by INTERMEDIATE VIDEO SUPPLIERS participating in the system.

The INTERMEDIATE VIDEO SUPPLIER may disable RESTART, REPLAY and other functions that reuse original material unless copyright holders have agreed to the reuse of their material.

The INTERMEDIATE VIDEO SOURCE SUPPLIERS may insert advertisements into restarted or replayed programs.

The INTERMEDIATE VIDEO SOURCE SUPPLIER may insert short substitute commercials when viewers fast-forward through commercials.

The system of the present invention comprises several components, including a Video Buffer, a Video Server, a virtual VCR, a Subscriber Video Scrapbook, and a Video Scrapbook Index. In addition, the components include a Local Control Unit and a Remote Control. The components may include a Local Video Buffer. A Subscriber Database and a Subscriber Order Database store information about subscribers, including usage information, orders to PLAY, RECORD, PAUSE, REPLAY, REWIND and other commands and any pre-scheduled recording requests the subscriber cares to place.

The system of the present invention is independent of any particular database management system, hardware, programming language or other technology for implementing the Video Buffer, the Video Server, the Subscriber Video Scrapbook or the Subscriber Database components of the invention.

The system of the present invention is also independent of any particular broadcast or network technology for transmitting programs to subscribers or receiving order and control information from subscribers. The system may be implemented with a hybrid combination of a high-speed digital link and an analog connection, such as the standard 75Q coaxial cabling network now used to supply television programs to subscribers' locations. It may also be implemented with a dedicated high-speed digital link connecting the subscriber location to the INTERMEDIATE VIDEO SUPPLIER, including a link to the Internet. In such an embodiment, each subscriber has a dedicated connection or "channel" to the INTERMEDIATE VIDEO SUPPLIER. A digital signal such as the signal provided by Satellite TV stations may also be used by creating an individual subscriber channel for every subscriber within each channel offered by the INTERMEDIATE VIDEO SUPPLIER.

In the hybrid system embodiment, control information and selected programming is delivered via the digital link, but the initial programming is received over the existing coaxial connection. The digital channel does not come into use until the subscriber selects a function like RESTART or REPLAY. At that point the video server begins to feed from the buffer. In the dual channel embodiment, a dedicated digital circuit is added to the existing analog circuit.

Where only a high-speed digital link is implemented, all communication between the subscriber and the INTERMEDIATE VIDEO SUPPLIER, including all order, control information and programming, travels back and forth over the dedicated digital channel, connecting the subscriber to the INTERMEDIATE VIDEO SUPPLIER. The link circuit replaces the analog coaxial system commonly in use now.

In the case of the highly multiplexed analog or digital channel, multiplexing techniques, using either time-division multiplexing with extremely short intervals or a combination of time and frequency division multiplexing is used to create individual subscriber channels within each program channel offered by the INTERMEDIATE VIDEO SUPPLIER.

The present invention may also be implemented using wireless communication to transmit and receive both control information and programming. Alternatively, wireless technology may be used to transmit control information or programming in conjunction with landlines. Thus, control information may be transmitted wirelessly, while programming is transmitted over a digital or an analog channel, or the programming may be transmitted wirelessly while the control information travels over digital or analog landlines.

The system of the present invention is independent of any particular technology for implementing the Local Control Unit and Remote Control or the Local Video Buffer. The system is also independent of any particular technology for making physical copies of the video from the Subscriber Video Scrapbook.

The system of the present invention includes high-speed network connections between INTERMEDIATE VIDEO SUPPLIERS so that the programming broadcast by one supplier is available to subscribers of the other intermediate supplier.

The system also includes long-term storage and a searchable database of archived and indexed programs created from the Video Buffers of all INTERMEDIATE VIDEO SUPPLIERS participating in the system.

The system of the present invention further includes a method for determining the amount of and paying any royalties due to content providers.

The system of the present invention further includes a method for determining which copyright holders have agreed to allow their programming to be restarted, replayed, recorded or otherwise reused.

The present invention also includes a method for inserting advertising at the beginning of the broadcast when subscribers RESTART or REPLAY a program and at other points in the program as well, including when subscribers FAST FORWARD through commercials.

Turning now to the drawings, in which like reference numerals identify similar or identical elements throughout the several views, FIG. 1 illustrates an overall concept of the system of the present invention. Originators of broadcast programming such as, for example, VIDEO SUPPLIERS 1.1 transmit the programs to CATV stations, Satellite TV stations, Global Computer Information Network sites, or other intermediaries such as, for example, INTERMEDIATE VIDEO SUPPLIERS 1.2, who transmit them to subscribers 1.3. The INTERMEDIATE VIDEO SUPPLIERS 1.2 may be connected to each other by means of high-speed networks. The INTERMEDIATE VIDEO SUPPLIERS 1.2 provide services to SUBSCRIBERS 1.3 and to VIDEO SUPPLIERS 1.2. The INTERMEDIATE VIDEO SUPPLIERS' 1.2 services to SUBSCRIBERS 1.3 include allowing SUBSCRIBERS 1.3 to browse through and select any channel they subscribe to, join any program in progress, and immediately restart the program from the beginning of the program with one action. The services also include allowing SUBSCRIBERS 1.3 to replay programs that were previously broadcast on channels they subscribe to, to record any number of programs at the same time, and to reset the entire system to a previous date and time in order to view an entire schedule of broadcast television programming as it was presented at a previous time.

The INTERMEDIATE VIDEO SUPPLIERS' 1.2 services to VIDEO SUPPLIERS 1.1 may include verifying that copyright holders agree to the reuse of their material before allowing SUBSCRIBERS 1.3 to restart, replay or otherwise reuse the material. The INTERMEDIATE VIDEO SUPPLIERS 1.2 can keep track of the programs and commercials SUBSCRIBERS 1.3 watch, restart, replay or otherwise reuse in order to bill SUBSCRIBERS 1.3 for the service, to calculate and remit royalty payments to copyright holders and to provide statistics to VIDEO SUPPLIERS 1.2 and advertisers about the number of times a program or commercial is viewed. The INTERMEDIATE VIDEO SUPPLIERS' 1.2 services to SUBSCRIBERS 1.3 and VIDEO SUPPLIERS 1.1 include playing short commercials when a SUBSCRIBER 1.3 restarts or replays a program and when a SUBSCRIBER 1.3 fast-forwards through a commercial. Thus, the system, taken as a whole, benefits INTERMEDIATE VIDEO SUPPLIERS 1.2, VIDEO SUPPLIERS 1.1 and SUBSCRIBERS 1.3 to the service by providing a unique television viewing experience to SUBSCRIBERS that produces additional revenue for INTERMEDIATE VIDEO SUPPLIERS and VIDEO SUPPLIERS.

Figure 2:
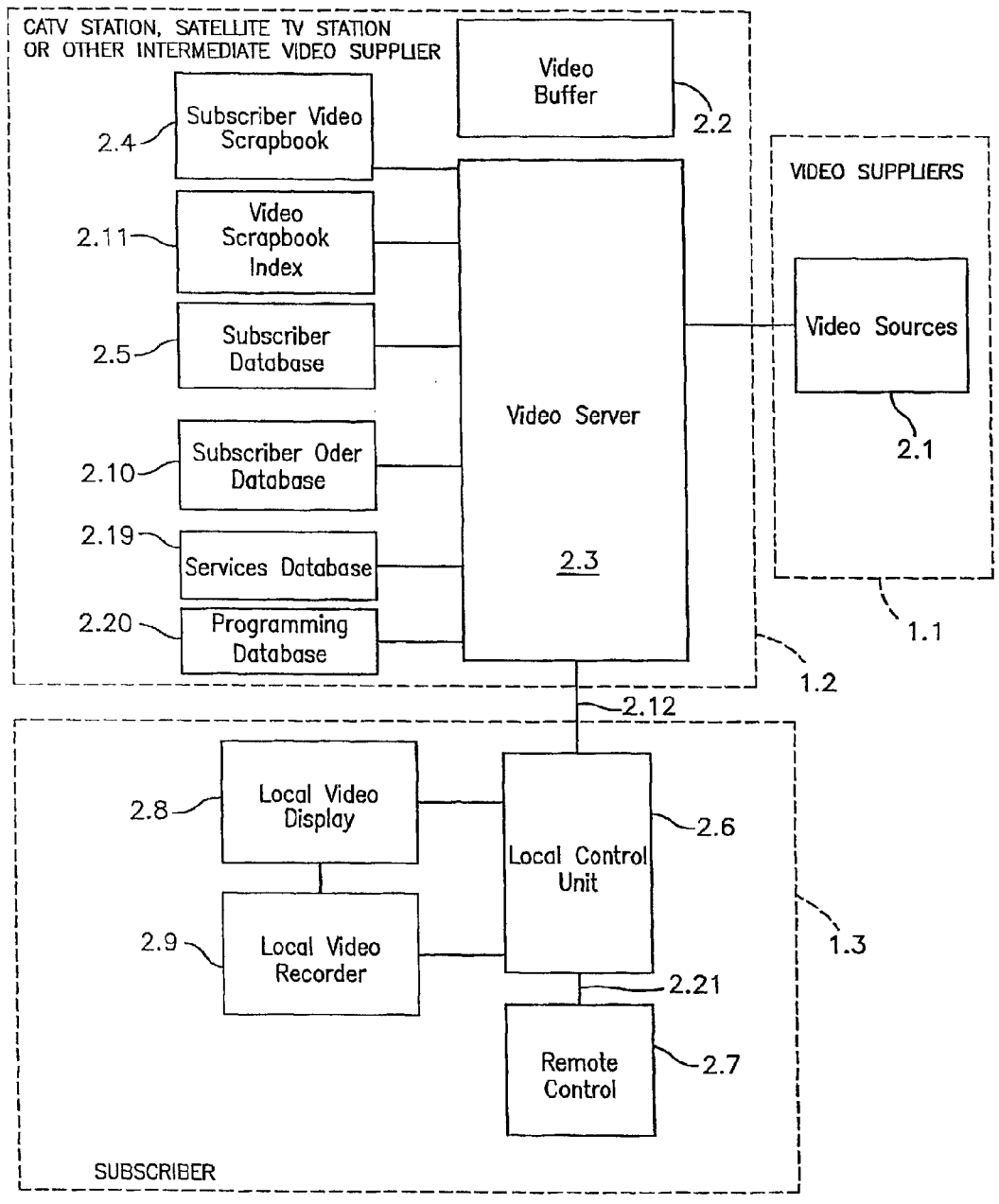
FIG. 2 is a block diagram, which illustrates the embodiment of FIG. 1 in greater detail.

Referring to FIG. 2, one preferred embodiment of the present invention is illustrated. The INTERMEDIATE VIDEO SUPPLIER 1.2 supplies programming data to the SUBSCRIBER 1.3 via a data link 2.12. As described above, the data link may be dedicated or highly multiplexed, using time-division multiplexing, a combination of time and frequency division multiplexing, or some other multiplexing technique to create individual subscriber channels within each channel offered by the INTERMEDIATE VIDEO SUPPLIER 1.2.

Any number of VIDEO SUPPLIERS 1.1 may provide programming to a CATV station, Satellite TV station, Global Computer Information Network site or other INTERMEDIATE VIDEO SUPPLIER 1.2.

Within the INTERMEDIATE VIDEO SUPPLIER 1.2 and SUBSCRIBER 1.3, a list of available services, e.g., broadcast channels and premium channels, is stored in a Services Database 2.19 and is used by subscribers to add or delete services, using Remote Control 2.7 and Local Control Unit 2.6 to send orders to the Video Server 2.3. A program schedule of all available programs, including present, future and past programs broadcast by THE INTERMEDIATE VIDEO SUPPLIER 1.2 is stored in a Programming Database 2.20 where it may be accessed by SUBSCRIBERS 1.3.

The Video Server 2.3 receives feeds from any number of multiple Video Sources 2.1 and simultaneously transmits the program data to the Local Control Units 2.6 of SUBCRIBERS 1.3 via a digital or analog data link 2.12 which may be wired or wireless and either dedicated or shared and records them in the station's Video Buffer 2.2.

Optionally, all programs may be transmitted to the Local Control Unit 2.6 from the Video Buffer 2.2 as the programs are recorded into the Video Buffer 2.2. The Video Server 2.3 receives subscriber requests from the Local Control Unit 2.6 and retrieves the corresponding desired program data according to the subscriber requests.

At the SUBSCRIBER'S 1.3 site, the program data is directed under the control of the Local Control Unit 2.6 to a Local Video Display 2.8, either directly or via a Local Video Recorder 2.9. Using the Remote Control 2.7 and the Local Control Unit 2.6, the SUBSCRIBER 1.3 initiates the subscriber requests to thereby order programs, switch channels, and view schedules, for example. Alternatively, additional subscriber interfaces may be provided, for example, a voice activated interface or a touch sensitive graphical user interface such as a touch screen display in order to initiate subscriber requests. The present invention also allows SUBSCRIBERS 1.3 to direct the Video Server 2.3 to RESTART programs and to avail themselves of a Subscriber Video Scrapbook 2.4 that provides SUBSCRIBERS 1.3 with a "virtual VCR" to record programs and personal storage for their recordings. Optionally, the present invention may limit RESTART, RECORD and other functions that reuse material to content covered by agreements with copyright holders that permit its reuse.

The Video Buffer 2.2 and Video Server 2.3 make it possible for SUBSCRIBERS 1.3 to access programming that has been aired previously, as far back as the intermediate video supplier's Video Buffer 2.2 stores data. For example, if the Video Buffer 2.2 stores video for a 24-hour period, the SUBSCRIBER 1.3 may access any programming that has been aired in the last 24 hours. If the Video Buffer 2.2 stores data for 48 hours, the SUBSCRIBER 1.3 may access any programming that has been aired in the last 48 hours, and so on. The SUBSCRIBER 1.3 may "order" any program aired earlier in the day. Or the SUBSCRIBER 1.3 may "order" a program that is almost over from its beginning. This is known as a RESTART function. In a preferred embodiment, a RESTART function is initiated via a dedicated button on the subscriber's Remote Control 2.7. Alternatively, the RESTART function may be initiated via a dedicated button located directly on the Local Control Unit 2.6. Additional subscriber interfaces may also be provided as noted above.

For example, a voice activated interface or a touch sensitive graphical user interface such as a touch screen display in order to initiate subscriber requests.

A SUBSCRIBER 1.3 who is watching TV, may "order" a program to go back a previous predetermined time period, for example, 2 minutes or 10 minutes of a program.

The SUBSCRIBER 1.3 may also PAUSE programs in progress, REWIND and RESTART them from any point, and, in cases where the program has already been aired, FAST FORWARD to any point in the program. In all such cases, the INTERMEDIATE VIDEO SUPPLIER'S 1.2 Video Server 2.3 sends the signal from the Video Buffer 2.2 instead of relaying a direct feed from the Video Source 2.1.

For illustrative purposes, when a subscriber activates the RESTART function, by pushing a dedicated button located on either the Local Control Unit 2.6 or Remote Control 2.7, the following events may occur. For example, when the subscriber presses a dedicated push button on the Remote Control 2.7, a restart command is transmitted to the Local Control Unit 2.6 via a Communication Link 2.21. The Communication Link 2.21 may be realized, for example, by an infrared transmitter and receiver, an RF transmitter and receiver, or a simple hardwire connection. The Local Control Unit 2.6 then transmits a subscriber request to the Video Server 2.3 via data link 2.12. The subscriber request may include, for example, data identifying the subscriber, billing information, the current program being viewed by the subscriber and the desired command, in this case the RESTART command. In the instance where the subscriber presses a dedicated button on the Local Control Unit 2.6, the subscriber request is transmitted to the Video Server 2.3 as noted above.

Meanwhile, the Video Server 2.3 is simultaneously storing the currently viewed program in the Video Buffer 2.2. The Video Server 2.3 receives and processes the subscriber request and immediately begins playing the program from the Video Buffer 2.2 from the beginning of the program. The program is transferred from the Video Server 2.3 to the Local Control Unit 2.6 via the data link 2.12 for viewing on the Local Video Display 2.8. Optionally, the Video Server 2.3 may examine information about the program to determine whether or not the copyright holder has agreed to its reuse before restarting the program.

Accordingly, a SUBSCRIBER 1.3 who starts viewing a program at some point after the beginning can elect to RESTART the program from the beginning with a single action, such as the push of a dedicated button on the Remote Control 2.7. The SUBSCRIBER 1.3 may also use the Remote Control 2.7, Local Control Unit 2.6 and Video Server 2.3 to access all of the features of the Subscriber Video Scrapbook 2.4.

Using the Subscriber Video Scrapbook 2.4, the SUBSCRIBER 1.3 may RECORD and STORE programs, EDIT programs, and copy PROGRAMS from the Subscriber Video Scrapbook 2.4 to a Local VCR 2.9 or other recording device in order to obtain a hard copy.

The SUBSCRIBER 1.3 may manipulate the Subscriber Video Scrapbook 2.4 directly or manipulate indexes and pointers into the Video Buffer 2.2 to perform all Subscriber Video Scrapbook 2.4 functions on programs that are available in the Video Buffer 2.2. The indexes and pointers are stored in the Video Scrapbook Index 2.11. It is not necessary to physically store programs in the Subscriber Video Scrapbook 2.4 until they are deleted from the Video Buffer 2.2.

The Video Server 2.3 records all SUBSCRIBER 1.3 transactions in a Subscriber Order Database 2.10 and in a Subscriber Database 2.5 to manage subscriber billing, royalty and license payments to INTERMEDIATE VIDEO SUPPLIER 1.2, Video Suppliers 1.1 and Video Sources 2.1 under license agreements that permit the SUBSCRIBER 1.3 to RESTART, REPLAY and RECORD programs, and to schedule programs, recording sessions and other events for SUBSCRIBERS 1.3. Additionally, the Subscriber Order Database 2.10 may record certain subscriber functions that require a premium fee. For example, in order to preserve a broadcast programmer's advertising revenues, a premium may be charged when a SUBSCRIBER 1.3 uses the FAST FORWARD FUNCTION to skip commercial advertisements during a prerecorded playback, or the FAST FORWARD FUNCTION itself may display a short commercial in place of the original advertisement.

Figure 2A:
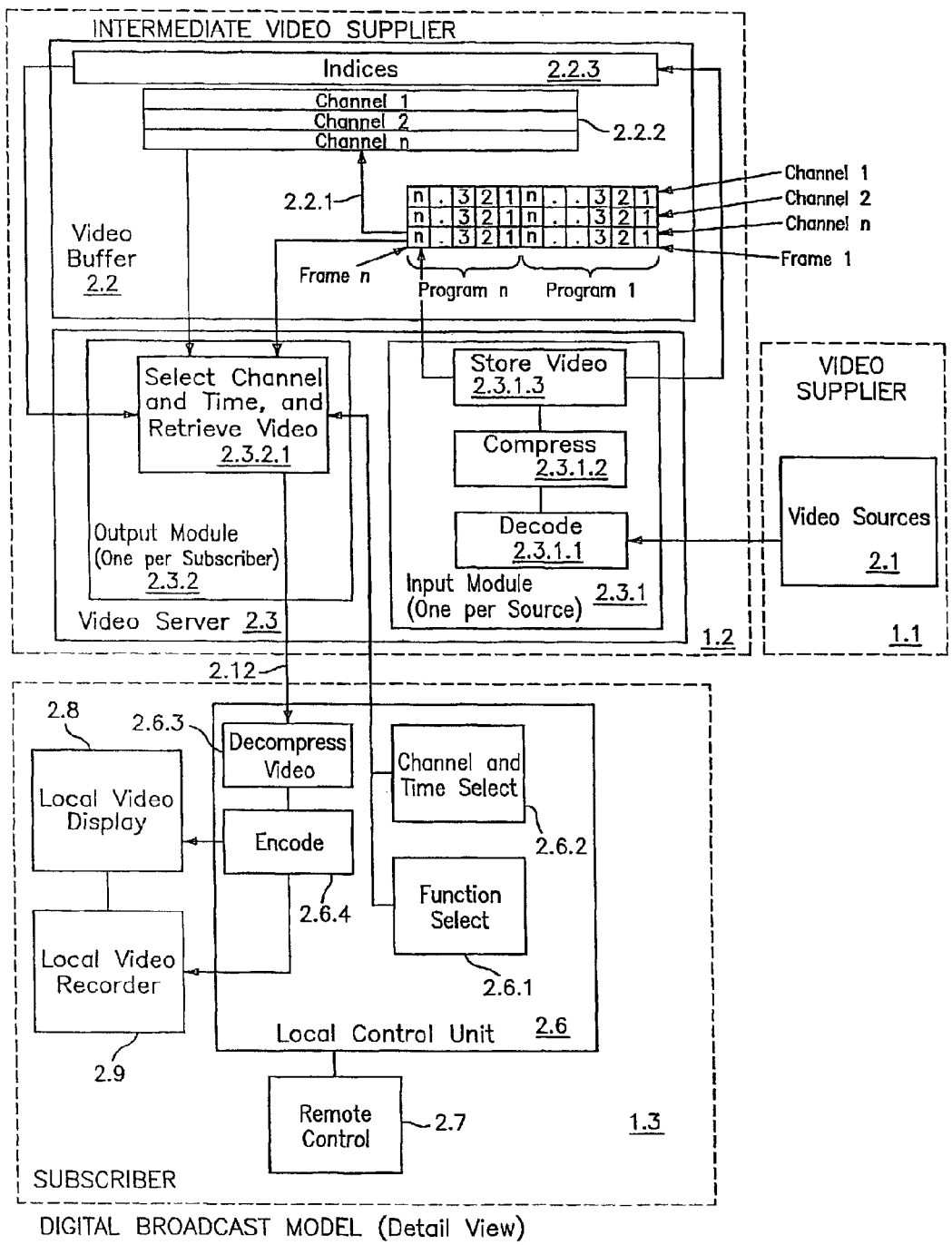
FIG. 2a is a block diagram, which illustrates in greater detail the functioning of a Video Server, Video Buffer and Local Control Unit according to one embodiment of the present invention.

Referring now to FIG. 2a, one implementation of the interaction of the Video Server 2.3, the Video Buffer 2.2 and the Local Control Unit 2.6 is illustrated for the first embodiment of the present invention. The Video Server 2.3 contains one or more Input Modules 2.3.1, handling incoming video from Video Sources 2.1, and one or more Output Modules 2.3.2 that function independently of the Input Modules 2.3.1 and handle SUBSCRIBER 1.3 interactions with the system. If the signal from a Video Source 2.1 is an analog signal, it is decoded and digitized by the Decode function 2.3.1.1 before passing it on to the Compress function 2.3.1.2. If the signal is already a digital signal, it is passed directly to the Compress function 2.3.1.2. The Compress function 2.3.1.2 compresses the digital signal for more efficient storage and transmission before passing it to the Store Video function 2.3.1.3.

Digital signals that are received in compressed form are passed directly to the Store Video function 2.3.1.3. The Store Video function 2.3.1.3 manages the storage and indexing of the digitized and compressed video signal, storing each frame of each program by channel and recording the location and broadcast time of the first frame of each program. Video may be moved from the high-speed storage 2.2.1 to slower and less expensive storage 2.2.2. The high-speed storage 2.2.1 can be implemented in Random Access Memory (RAM), for example, while less expensive storage 2.2.2 may be implemented using Random Access Disk Drives. Optionally, additional layers of progressively slower and cheaper storage may be added to the system. The high-speed storage area 2.2.1 is organized as a series of channels from 1 to n. Within each channel, each program from 1 to n is organized as a series of frames from 1 to n, with 1 representing the first frame of a program and n representing the last or current frame being received.

Throughout the life cycle of a program, its location is maintained in Indices 2.2.3 by the Store Video function 2.3.1.3.

From a systems standpoint, the Input Module (or Modules) 2.3.1 is responsible for receiving, decoding, compressing and delivering or "broadcasting" each program to the high-speed storage area 2.2.1 where it is available to the Output Module 2.3.2, then moving the video to slower and cheaper storage as the faster but more expensive storage fills up. Considered from the standpoint of the currency of the video, storage area 2.2.1 contains "real time" video that will be picked up by the Output Module 2.3.2 and passed on to SUBSCRIBERS 1.3 as it is received. Storage area 2.2.2 contains video that has already been broadcast to SUBSCRIBERS 1.3 or that has been received from a Video Source and stored for later broadcast to SUBSCRIBERS 1.3. Optionally, the task of managing storage by moving video from the high-speed storage area to progressively slower and cheaper storage could be accomplished by a separate Storage Management function.

Turning now to the functioning of the Output Module 2.3.2, one method of delivering programs to SUBSCRIBERS 1.3 is described. The Select Channel and Time and Retrieve Video function 2.3.2.1 receives commands from the SUBSCRIBER'S Local Control Unit 2.6. Based on the channel and command, the Select Channel and Time and Retrieve Video function 2.3.2.1 retrieves the compressed video from storage area 2.2.1 or 2.2.2 and sends it to the Local Control Unit 2.6, where it is decompressed, and, if necessary, encoded for display. If, for example, the SUBSCRIBER selects Channel 2, the Output Module 2.3.2 transmits the nth or current frame of the program currently being stored in Channel 2 of storage area 2.2.1, and then continues to transmit the nth or current frame until a new command is received. If, for example, a RESTART command is received, the Output Module 2.3.2 locates the first frame of the program currently being transmitted to the SUBSCRIBER 1.3 and, instead of transmitting the nth or current frame, immediately begins transmitting the program from the first frame.

In the case of a command to REPLAY a previously broadcast program, the program may be selected by channel and time, or it may be selected from a schedule or menu by name. Organizing the video by channel, program and time makes it possible for SUBSCRIBERS 1.3 to jump or to roll back through time for one channel or for all channels at the same time. Rolling back or jumping back to a previous time for all channels at the same time effectively restores the entire system to some point in the past, allowing SUBSCRIBERS 1.3 to watch television as if they were viewing it hours or days before. SUBSCRIBERS 1.3 may use simple and familiar aids such as printed TV Guides to decide which programs to REPLAY instead of being forced to rely on unnecessarily complex menus and other selection schemes.

Optionally, the Output Module 2.3.2 may verify that copyright holders have agreed to the reuse of their material before RESTARTING or REPLAYING a program or otherwise reusing it. Such a verification step may be accomplished in a number of ways, including checking copyright holder information from a header or label of each program as it is received against a list of copyright holders who have agreed to allow their content to be RESTARTED, REPLAYED or otherwise reused, or by including reuse information directly in the header or label of each program. Because the Input Module 2.3.1 is storing every program in the Video Buffer 2.2 as it is being received, SUBSCRIBERS 1.3 are able to instantly RESTART any program from its beginning.

Figure 2B:
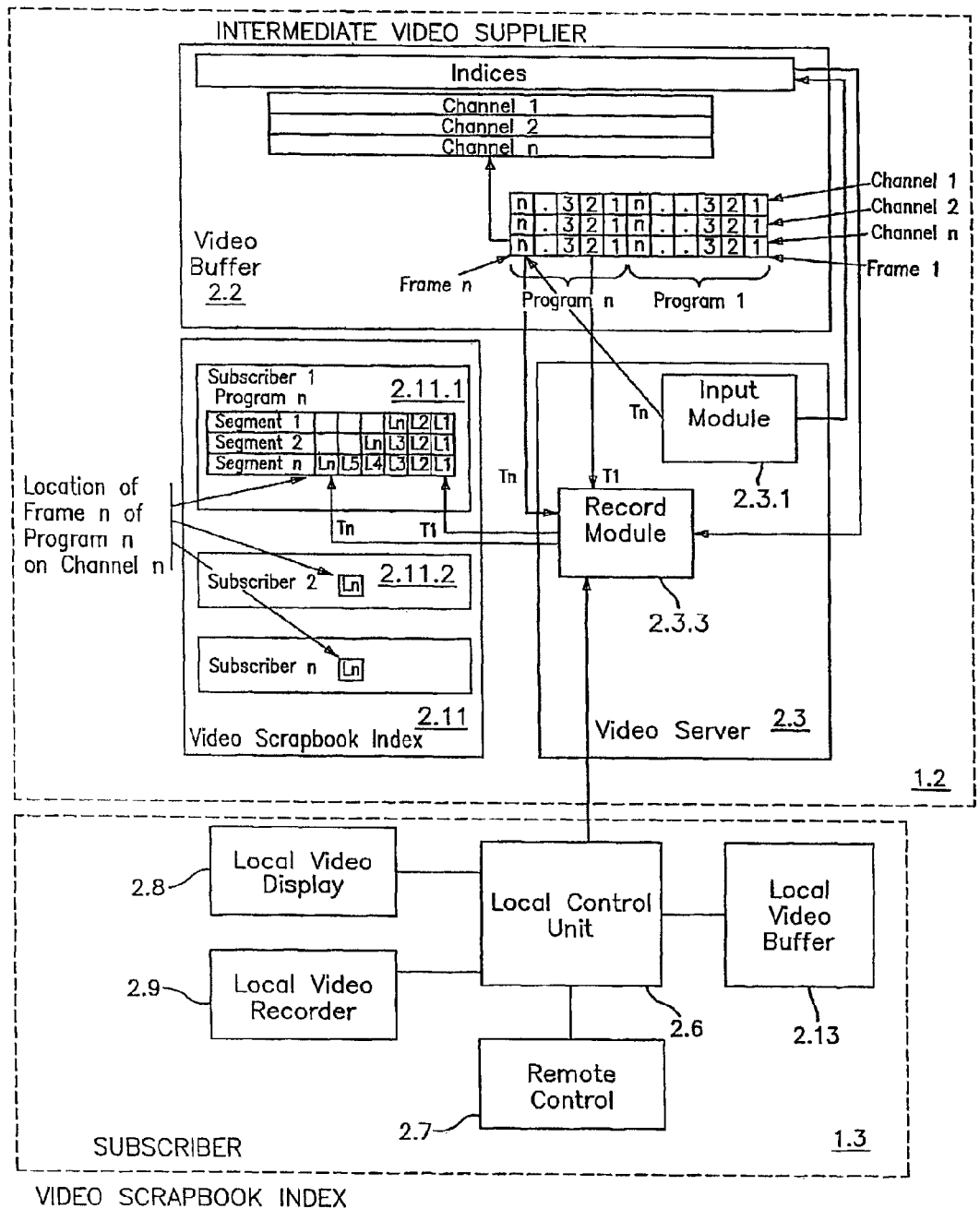
FIG. 2b is a block diagram of one way the system may manipulate pointers to perform all Subscriber Video Scrapbook functions on programs stored in the Video Buffer.

Referring to FIG. 2b, one embodiment of the Video Scrapbook Index 2.11 is described, illustrating one way the system may manipulate pointers into the Video Buffer 2.2 to perform all Subscriber Video Scrapbook functions on programs that are available in the Video Buffer 2.2. For example, if Subscriber 1 is watching Frame 2 of Program n on Channel n at time T1, and Subscriber 1 presses the RECORD button on the Remote Control 2.7, the Local Control Unit 2.6 sends a RECORD command to a Record Module 2.3.3 in the Video Server 2.3. Instead of recording the actual contents of Frame 2, the Record Module 2.3.3 records the location of Frame 2 in a Video Scrapbook Index 2.11, which is organized by Subscriber, Segment and Frame Location. The location of Frame 2 is recorded in the index for Subscriber 1, which is denoted by reference numeral 2.11.1, at Frame Location LI of Segment n. The Record Module 2.3.3 continues to record the location of each frame until the Subscriber 1 signals the Record Module to stop recording.

As the Record Module 2.3.3 continues to record the program, at each time Tn, the location of Frame n is recorded in Frame Location Ln of Segment n for Subscriber 1.

In the same way, other Subscribers may be recording the same program at the same time.

Because the system is recording the locations of frames instead of the frames themselves, the system only needs to maintain one copy of every program in the Video Buffer 2.2.

When a SUBSCRIBER 1.3 plays a segment that was previously recorded, the system looks up the Video Buffer 2.2 location of the first frame of the segment and of each subsequent frame in the Video Scrapbook Index 2.11, retrieves the frames from the Video Buffer 2.2, and transmits them to the Local Control Unit 2.6 for display.

Figure 3:
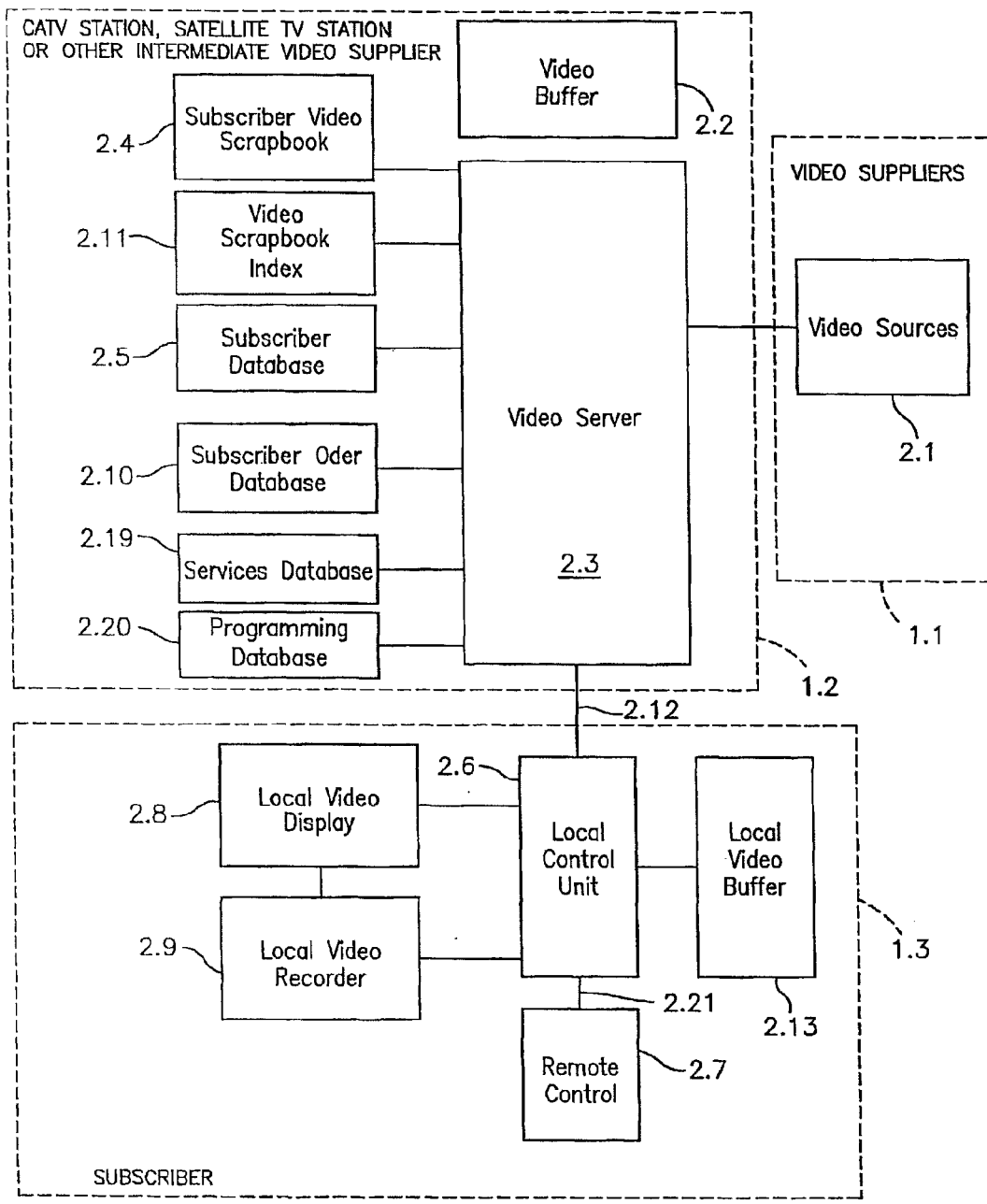
FIG. 3 is a block diagram, which illustrates another embodiment of the present invention with a Video Buffer added to a Local Control Unit to buffer the entire broadcast schedule of an INTERMEDIATE VIDEO SUPPLIER, a substantial portion of a broadcast schedule, or a program being viewed.

Referring now to FIG. 3, another embodiment of the present invention is illustrated that includes a Local Video Buffer 2.13. The Local Video Buffer 2.13 may be used in conjunction with or in place of the Video Buffer 2.2 at the INTERMEDIATE VIDEO SUPPLIER 1.2. The Local Video Buffer 2.13 may buffer the entire broadcast schedule of the intermediate video source, a substantial portion of the broadcast schedule, or the current program being viewed. In all other respects, the functioning of the embodiment depicted in FIG. 3 is identical with the embodiment shown in FIG. 2.

Figure 4:
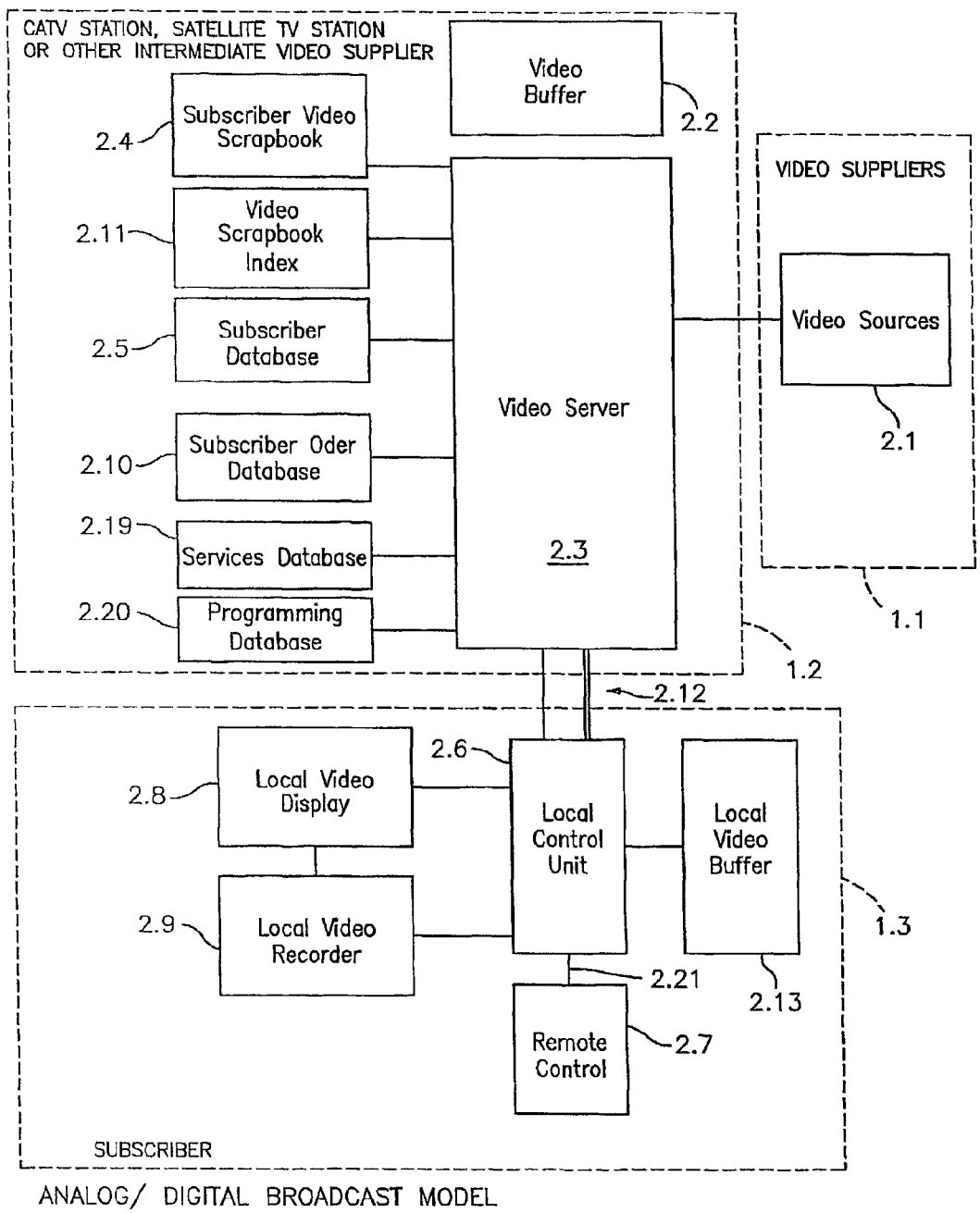
FIG. 4 is a block diagram, which illustrates another embodiment of the present invention, using a dual analog/digital circuit to connect the subscriber premises to an INTERMEDIATE VIDEO SUPPLIER.

With reference now to FIG. 4, yet another embodiment of the present invention is illustrated, which utilizes a dual analog/digital data link to connect the INTERMEDIATE VIDEO SUPPLIER 1.2 to the SUBSCRIBER 1.3 and to transmit control information and programming. This embodiment incorporates all of the functions of the FIGS. 2 and 3 embodiments, but adds an analog data link to the data link 2.12 between the INTERMEDIATE VIDEO SUPPLIER and the SUBSCRIBER 1.3. The additional analog channel allows the subscriber to receive and select all broadcast channels at the home in the same way that CATV subscribers receive and select channels using the prior art. The Video Server 2.3 sends programming via the analog data link component of 2.12 to the Local Control Unit 2.6 where the SUBSCRIBER 1.3 selects channels to watch. When system functions like RESTART, REPLAY or PAUSE are invoked by the SUBSCRIBER 1.3, the Video Server 2.3 automatically selectively enters a digital mode and accordingly sends the program from the Video Buffer 2.2 to the Local Control Unit 2.6 via the digital data link. Until the SUBSCRIBER 1.3 resumes normal broadcast channel watching, all interaction between the Video Server 2.3 and the Local Control Unit 2.6 takes place over the digital data link component of the data link 2.12. However, when the SUBSCRIBER 1.3 resumes normal broadcast channel watching, the Local Control Unit 2.6 automatically reverts to the feed from the analog data link. In cases where the Local Video Buffer 2.13 is employed to buffer broadcasts, the analog signal is stored in the Local Video Buffer 2.13 as it is received at the SUBSCRIBER 1.3 location, and functions like RESTART, REPLAY and PAUSE are provided by manipulating data from the Local Video Buffer 2.13 under the control of the Local Control Unit 2.6. In that case, the digital data link may optionally be employed to send control information back and forth between the Video Server 2.3 and the Local Control Unit 2.6. In all other respects, the functions provided by the embodiment shown in FIG. 4 are similar with the embodiments described in previous drawings.

Figure 4A:
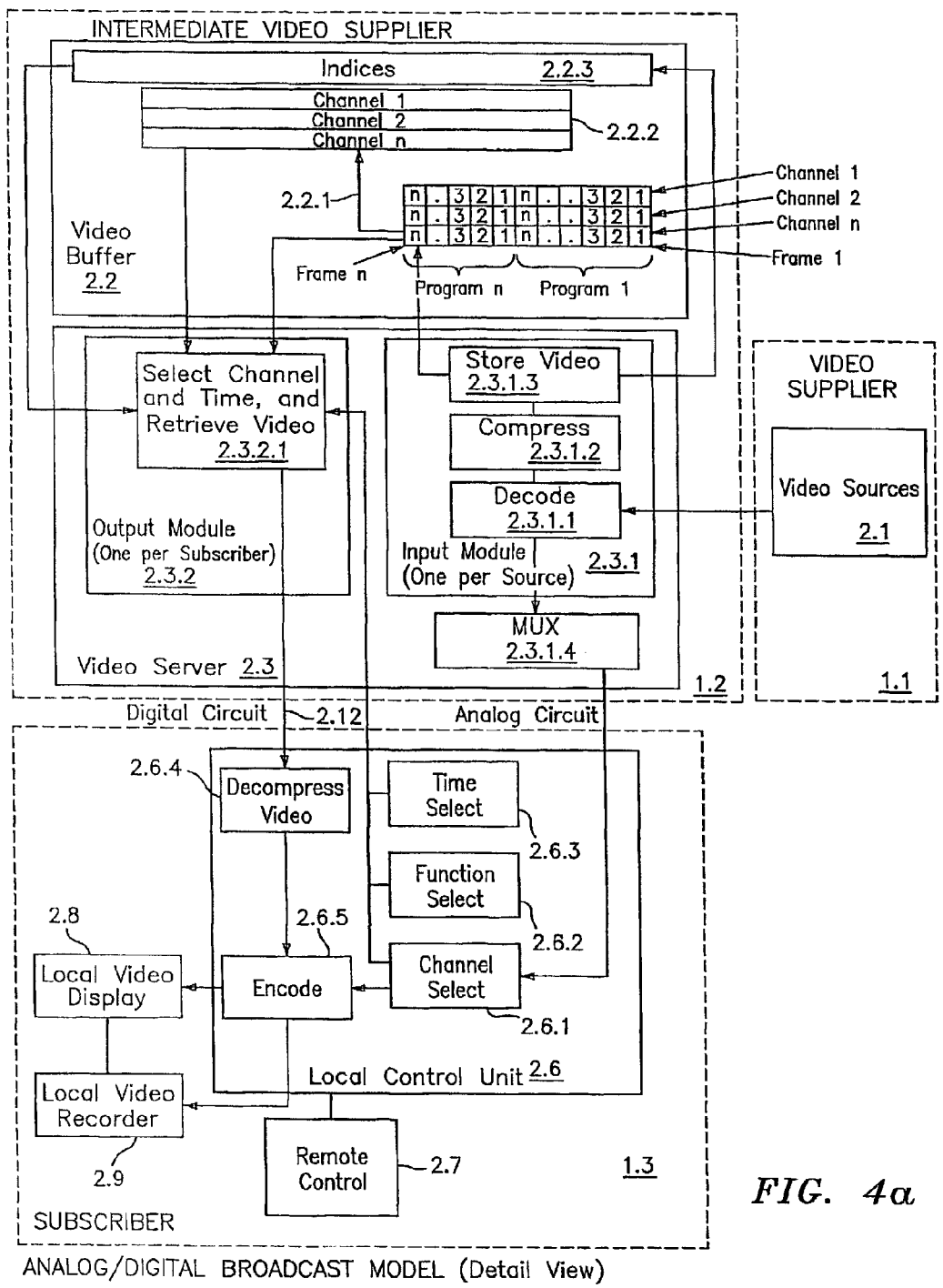
FIG. 4a is a block diagram, which further illustrates the dual analog/digital data link embodiment of the present invention.

With reference to FIG. 4a, signals from Video Sources 2.1 are received and stored by the Input Module 2.3.1. At the same time, the signals are multiplexed and transmitted over the analog circuit to Local Control Unit 2.6 by Multiplexer 2.3.1.4. The Channel Select function 2.6.1 selects a channel and passes the video to the Encode function 2.6.5, which passes the video to the Local Video Display 2.8 and/or the Local Video Recorder 2.9. When a SUBSCRIBER 1.3 selects a function like RESTART or REPLAY, the system switches instantly to retrieval mode, and the Select Channel and Time and Retrieve Video function 2.3.2.1 retrieves the video from the Video Buffer 2.2 and transmits it over the digital circuit to the Local Control Unit 2.6.

For example, if the SUBSCRIBER 1.3 is watching Channel 2 and presses the RESTART button on a Remote Control 2.7, the system switches to retrieval mode, and the Output Module 2.3.2 instantly retrieves the recorded version of the program currently playing on Channel 2 from the Video Buffer 2.2, and transmits it to the Local Control Unit 2.6 over the digital circuit, beginning with Frame 1. The Encode function 2.6.5 encodes and/or transmits the decompressed video signal to the Local Video Display 2.8 and/or the Local Video Recorder 2.9 in place of the signal being received over the analog circuit. If the SUBSCRIBER 1.3 changes the channel, the system returns to normal viewing mode, and the Encode function 2.6.5 sends the signal from the analog connection to the Local Video Display 2.8 and/or the Local Video Recorder 2.9. But, because the system is recording the new channel in the Video Buffer 2.2 while it is multiplexing it and transmitting it to the SUBSCRIBER 1.3 over the analog circuit, the SUBSCRIBER 1.3 is able to RESTART that program from its beginning as well.

Figure 5:
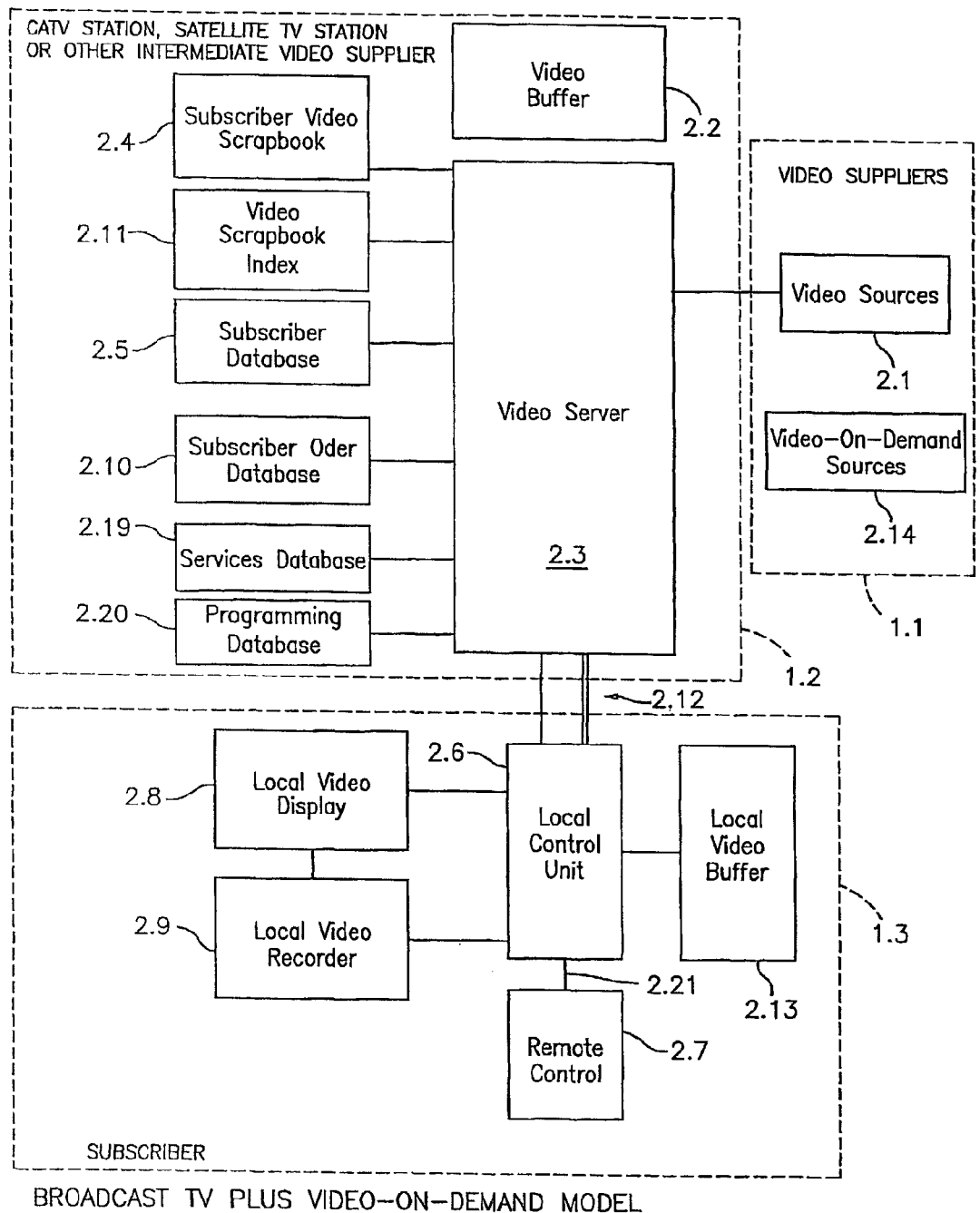
FIG. 5 is a block diagram, which illustrates yet another embodiment of the invention, using either a dual analog/digital circuit or a dedicated digital or analog circuit to connect the subscriber location to an INTERMEDIATE VIDEO SUPPLIER, which acts as a clearinghouse for "on demand" programming from VIDEO SUPPLIERS in addition to providing broadcast television programs, a virtual VCR and video storage to subscribers.

FIG. 5 illustrates yet another embodiment of the present invention, wherein the INTERMEDIATE VIDEO SUPPLIER 1.2 acts as a clearinghouse or distributor for Video On-Demand Sources 2.14. In addition to feeds from VIDEO SOURCES 2.1, the INTERMEDIATE VIDEO SUPPLIER 1.2 receives feeds from Video On Demand Sources 2.14. The Video Server 2.3 simultaneously transmits the programs to the Local Control Units 2.6 of SUBSCRIBERS 1.3 and records them in the station's Video Buffer 2.2.

Optionally, all programs may be transmitted from the Video Buffer 2.2. Orders and other control information may be transmitted from the Local Control Unit 2.6 to the Video On Demand Source 2.14 via the INTERMEDIATE VIDEO SUPPLIER'S Video Server 2.3.

Requests for programs can be filled either directly from the Video On Demand Source 2.14 or from copies of the programs stored in the INTERMEDIATE VIDEO SUPPLIER'S Video Buffer 2.2. In all other respects, the functions provided by the embodiment shown in FIG. 5 are similar to the embodiments described in previous drawings.

Figure 6:
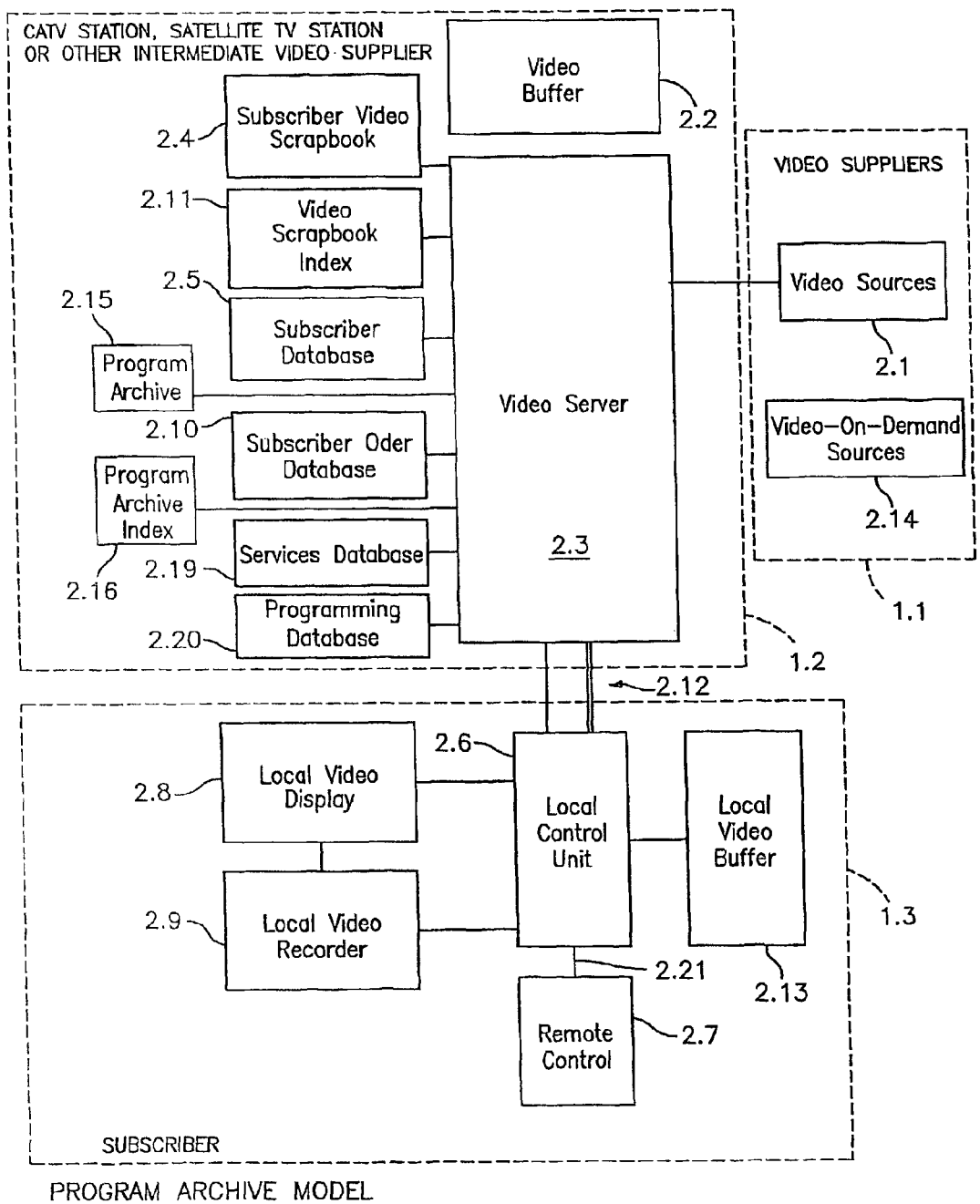
FIG. 6 is a block diagram, which illustrates a further embodiment of the present invention, adding a program archive and a program archive index in order to create a searchable database of previously broadcast material.

FIG. 6 illustrates yet another embodiment of the invention with a Program Archive 2.15 and Program Archive Index 2.16 added to allow SUBSCRIBERS 1.3 to search for and view programming previously broadcast by the system. The addition of archival storage and an index into the archive allows the system to continue to store programs after they have been deleted from the Video Buffer 2.2 or the Local Video Buffer 2.13, possibly to make room for new programs. SUBSCRIBERS 1.3 are able to use their Local Control Unit 2.6 to search the Program Archive Index 2.15 by subject or theme, for example, and to retrieve and view programs from the Program Archive 2.16 via the Video Server 2.3. In all other respects, the functions provided by the embodiment shown in FIG. 6 are similar to the embodiments described in previous drawings.

Figure 7:
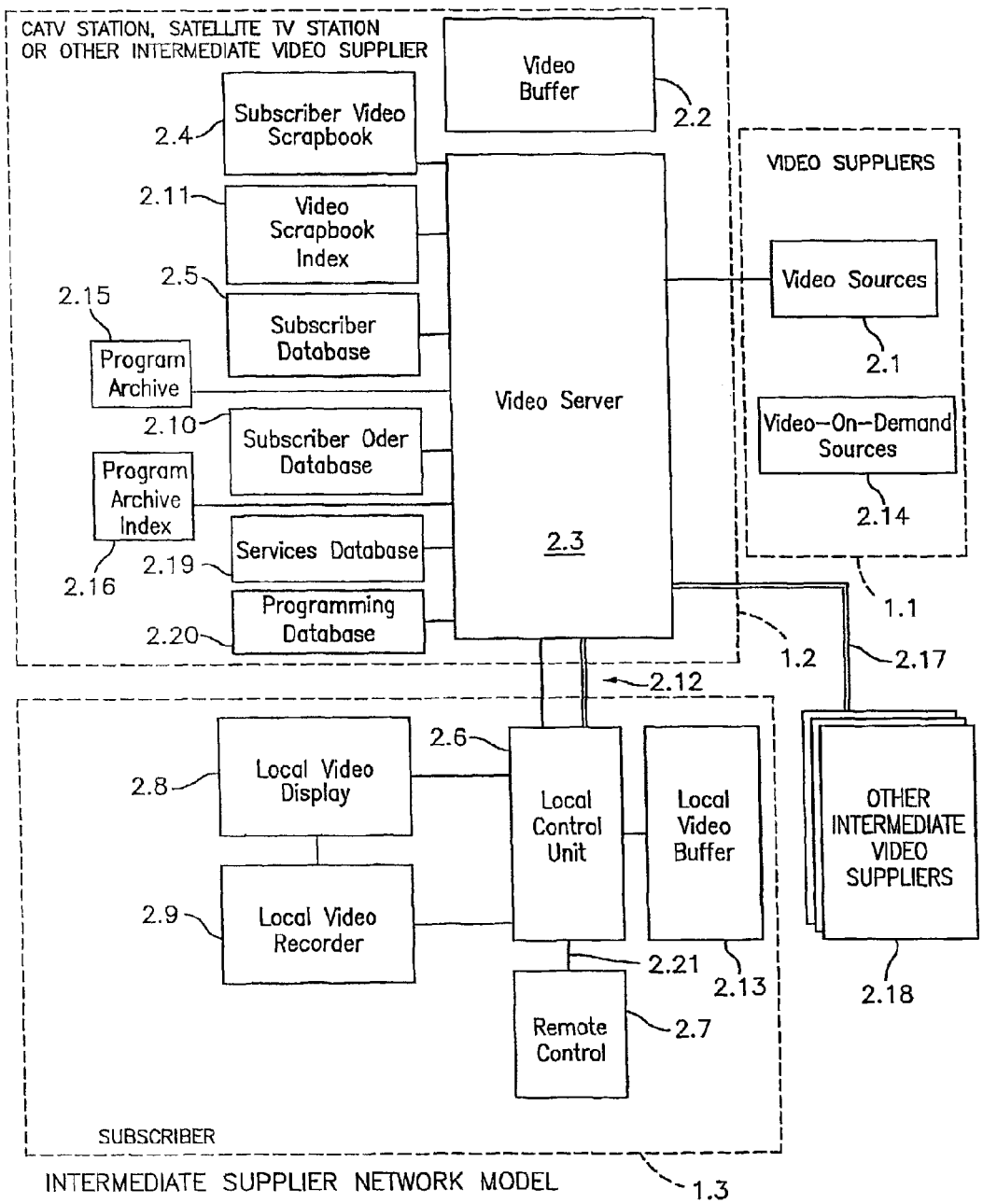
FIG. 7 is a block diagram, which illustrates another embodiment of the present invention, connecting geographically dispersed INTERMEDIATE VIDEO SUPPLIERS by means of a high-speed connection to allow the programming broadcast by all of the INTERMEDIATE VIDEO SUPPLIERS in the system to be accessed and manipulated by any subscriber to any intermediate video source.

FIG. 7 illustrates still another embodiment of the invention that connects geographically dispersed OTHER INTERMEDIATE VIDEO SUPPLIERS 2.18 to INTERMEDIATE VIDEO SUPPLIER 1.2 by means of a high-speed connection to allow the programming broadcast by all of the intermediate video suppliers in the system to be accessed and manipulated by any subscriber of any intermediate video supplier. In addition, archived programming from all intermediate video suppliers can be searched and viewed by any subscriber of any intermediate video supplier. In all other respects, the functions provided by the embodiment shown in FIG. 7 is similar to the embodiments described in previous drawings.

Figure 8:
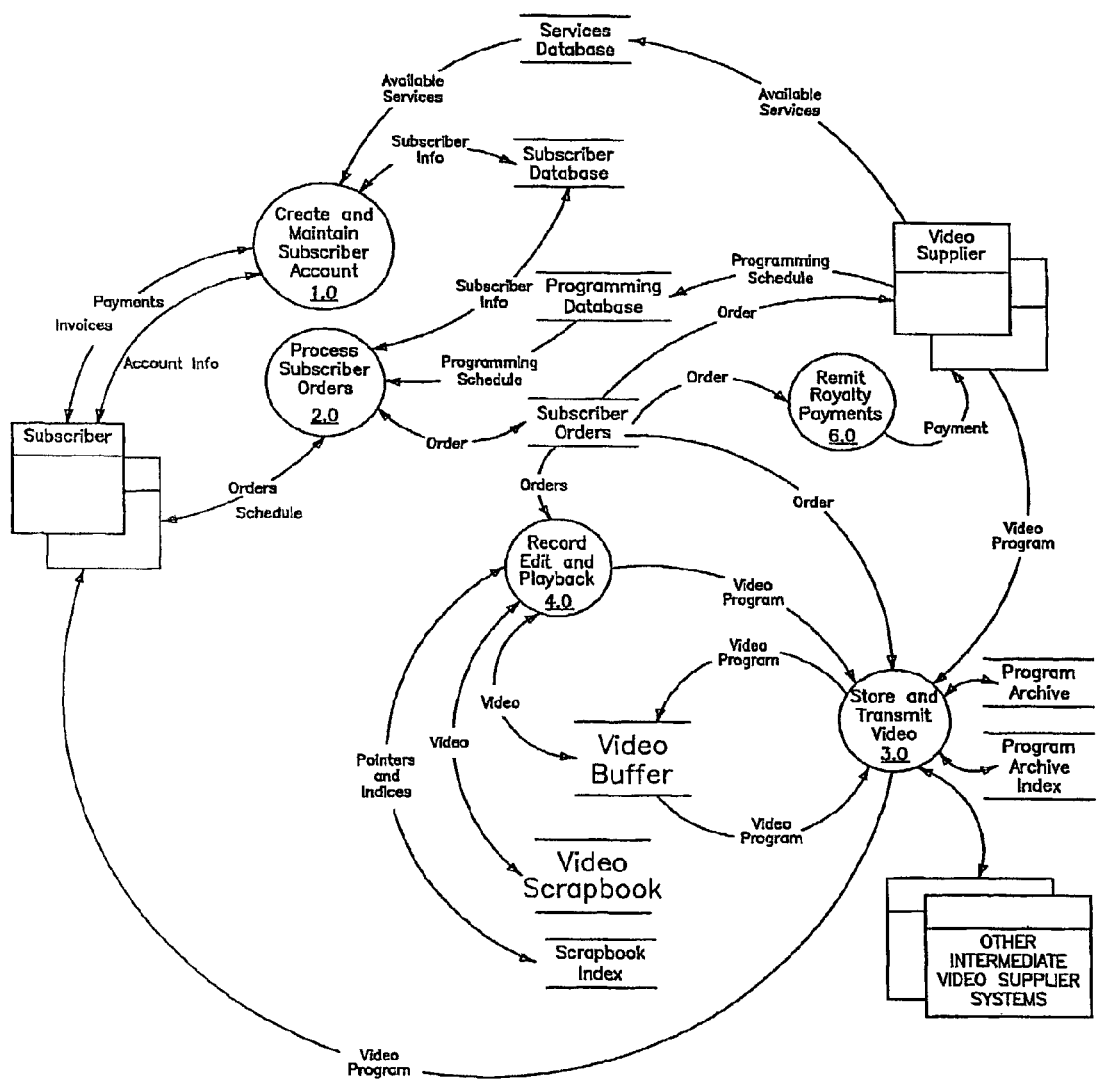
FIG. 8 is a process and data flow diagram that illustrates the processes performed by an INTERMEDIATE VIDEO SOURCE SUPPLIER in accordance with one embodiment of the present invention.

FIG. 8 illustrates the processes performed by the INTERMEDIATE VIDEO SUPPLIER 1.2 in accordance with one embodiment of the present invention.

With reference now to FIGS. 7 and 8, VIDEO SUPPLIERS 1.1 provide a list of services and a schedule of programs that are stored in a Services Database 2.19 and a Programming Database 2.20 at the INTERMEDIATE VIDEO SUPPLIER 1.2. The Programming Database 2.20 may also include information about licensing agreements for each program, or that information may be included in each program's header or label. The INTERMEDIATE VIDEO SUPPLIER 1.2, e.g., CATV and Satellite TV Station, Global Computer Information Network site or service provider and OTHER INTERMEDIATE VIDEO SUPPLIER 2.18, also maintains a Subscriber Database 2.5, a Subscriber Orders Database 2.10, a Services Database 2.19 and a Programming Database 2.20.

The INTERMEDIATE VIDEO SUPPLIER 1.2 performs two processes, described as Create and Maintain Subscriber Account 1.0 and Process Subscriber Orders 2.0 in order to set up and maintain a Subscriber account and to enter Subscriber Orders and Commands into the Subscriber Orders Database 2.10 where the Video Server 2.3 can access them.

The Create and Maintain Subscriber Account 1.0 process allows SUBSCRIBERS 1.3 to choose services from the Services Database 2.19, and allows the INTERMEDIATE VIDEO SUPPLIER 1.2 to maintain Subscriber billing and service information, and to bill SUBSCRIBERS 1.3 for services. This information may be maintained on line by the SUBSCRIBER 1.3 over the Internet or through the Local Control Unit 2.6 and Remote Control 2.7 at the SUBSCRIBER'S 1.3 location, or maintained by the INTERMEDIATE VIDEO SUPPLIER 1.2. The present invention itself would be one such service, subscribed to along with the other basic and premium services that are provided by the INTERMEDIATE VIDEO SUPPLIER 1.2.

The Process Subscriber Orders 2.0 process enters and maintains SUBSCRIBER 1.3 orders and commands entered by the SUBSCRIBER 1.3 through the Local Control Unit 2.6 or Remote Control 2.7. All system functions are available through this process, including selecting programs to view and record from the Programming Database 2.2.

These programs can be programs currently being broadcast, previously broadcast or scheduled for future broadcast.

The Video Server 2.3 at the INTERMEDIATE VIDEO SUPPLIER 1.2 will perform the Store and Transmit Video 3.0 process for all SUBSCRIBERS 1.3, simultaneously transmitting subscribed to Video Source feeds to SUBSCRIBERS 1.3 and recording all feeds in the Video Buffer 2.2. For programs being broadcast or scheduled for future broadcast, the Video Server 2.3 will select either the live feed from the Video Source or a feed from the Video Buffer 2.2 to fill the order. For programs that have already been broadcast, the Video Server 2.3 will fill the order with a feed from the Video Buffer 2.2. Alternatively, INTERMEDIATE VIDEO SUPPLIERS 1.2 may choose to route all feeds from Video Sources to SUBSCRIBERS 1.3 through the Video Buffer 2.2.

If the system includes a Local Video Buffer 2.13 in addition to or in place of the Video Buffer 2.2 at the INTERMEDIATE VIDEO SUPPLIER 1.2, the Local Control Unit 2.6 will work in conjunction with the Video Server 2.3 to execute Store and Transmit Video Process 3.0. In order to make room for new programs in the Video Buffer 2.2, programs may be moved to longer-term storage in a Program Archive 2.15 database. As programs are stored in the Program Archive 2.15, they are indexed manually, automatically, or by a combination of manual and automatic techniques, so that subscribers may retrieve them.

High-speed connections to OTHER INTERMEDIATE VIDEO SUPPLIERS 2.18 makes it possible for subscribers of any INTERMEDIATE VIDEO SUPPLIER 1.2 to access programs and archived programs from any OTHER INTERMEDIATE VIDEO SUPPLIER 2.18 in the system. The Video Server 2.3 and/or the Local Control Unit 2.6 may insert advertisements and other material into the video stream at the beginning of a program RESTART or REPLAY, or at any other point in the video stream as it is delivered from the Video Buffer 2.2 or the Local Video Buffer 2.13.

The Video Server 2.3 at the INTERMEDIATE VIDEO SUPPLIER 1.2 will perform the Record, Edit and Playback 4.0 process to provide virtual VCR services to individual subscribers. The Record, Edit and Playback 4.0 process operates either on command or on preprogrammed schedule, depending on the orders entered by the SUBSCRIBER 1.3 into the Subscriber Orders Database 2.10. The RECORD function can operate off of either the direct feed from the Video Source or off of the feed from the Video Buffer 2.2. Video from either the Video Buffer 2.2 or from the direct feed is ether recorded in the Subscriber Video Scrapbook 2.4, or a table of pointers and indices into the Video Buffer 2.2 is built in the Video Scrapbook Index 2.11. The table of indices and pointers in the Video Scrapbook Index 2.11 allows the data in the Video Buffer 2.2 to be organized by Subscriber and Program, and manipulated as though it were stored in the Subscriber Video Scrapbook 2.4. All other virtual VCR functions, e.g., PAUSE, RESTART, REWIND, FAST FORWARD, REVERSE, SLOW MOTION, EDIT and PLAYBACK operate on either the Video Buffer 2.2, using pointers and indices, or on the Subscriber Video Scrapbook 2.4. When the program is deleted from the Video Buffer 2.2, a copy is made to the Subscriber Video Scrapbook 2.4 using the pointers and indices. If the program is moved to the Program Archive 2.15, pointers and indexes are updated to point to the program in the Program Archive 2.15. This method of implementing the Subscriber Video Scrapbook 2.4 virtual VCR allows the INTERMEDIATE VIDEO SUPPLIER 1.2 to provide virtual VCR functions and storage at a lower cost than the cost of actually storing data in the Subscriber Video Scrapbook 2.4. One copy of all programming is stored in the Video Buffer 2.2 or in the Program Archive 2.15. What is maintained for each SUBSCRIBER 1.3 is a table of indices and pointers that lets the system pull video from the Video Buffer 2.2 or Program Archive 2.15 as if it is coming from an individual copy created by the SUBSCRIBER 1.3, as long as the video is available in the Video Buffer 2.2 or the Program Archive 2.15. If the SUBSCRIBER 1.3 optionally subscribes to a longer-term storage, when the program has to be deleted from the Video Buffer 2.2 or Program Archive 2.15, the table of pointers and indices can be used to create an individual edited copy in the Video Scrapbook 2.4, where it will continue to be available for editing or playback.

The Remit Royalty Payments 5.0 process transmits payments to content copyright holders, based on subscriber orders and agreements with the content copyright holders. Table 1 lists and further describes the Components and Functions of the invention.

TABLE 1

| Components and Functions | |
|---|---|
| Component or Function | Description |
| THE SYSTEM OF THE INVENTION | The complete system with all of its Components, functions, features and Interrelated parts that make up the invention, system and method for providing programs, a virtual VCR and a Video Scrapbook to Cable TV, Satellite TV, Global Computer Information Network site and other INTERMEDIATE VIDEO SUPPLIERS and ultimately to end user SUBSCRIBERS |
| Video Server | Apparatus and method to control the feed of programs to SUBSCRIBERS and to allow SUBSCRIBERS to manipulate programs and perform all of the functions of the system |
| Video Buffer | Stores the programming received from Video Suppliers at the INTERMEDIATE VIDEO SUPPLIER site. By storing the programming as it is transmitted to SUBSCRIBERS, the INTERMEDIATE VIDEO SUPPLIER is able to make it available to SUBSCRIBERS as it is being recorded and again at a future time |
| Video Scrapbook | Provides virtual VCR functions and storage for recorded materials at the INTERMEDIATE VIDEO SUPPLIER site to SUBSCRIBERS |
| Video Scrapbook Index | A table of pointers and indexes into the Video Buffer, organized by Subscriber, Program, Segment, etc., that allows the SUBSCRIBER to manipulate and view video in the Video Buffer as though it were stored in his or her Video Scrapbook |
| VCR | Video Cassette Recorder. A physical video recording device that stores video on a tape cassette |
| Virtual VCR | Provides all of the functions of a physical Video Cassette Recorder without the actual physical apparatus. In the case of the present invention, a Virtual VCR is provided as a service to INTERMEDIATE VIDEO SUPPLIER Subscribers |
| INTERMEDIATE VIDEO SUPPLIER | INTERMEDIATE VIDEO SUPPLIER Source of television and other video programming that makes video from a number of video sources available to SUBSCRIBERS, e.g., Cable TV Stations, Satellite TV Stations, Global Computer Information Network sites and other Service Providers. |
| VIDEO SUPPLIER | Source of television and other video programming, e.g., Television Networks, Distributors, Premium Channels |
| Video Source | Source of the television and other video signal, e.g., a specific television program |
| Video-On-Demand Source | Source of pre-recorded video |
| SUBSCRIBER | Customer of the INTERMEDIATE VIDEO SUPPLIER |
| DIRECT FEED | Video programs coming from a Video Supplier or Video Source |
| RECORD | The RECORD function stores the video program in the Video Scrapbook or creates a Video Scrapbook Index, a table of pointers and indices into the Video Buffer that allows SUBSCRIBERS to manipulate and view the video in the Video Buffer as though it is stored in the Video Scrapbook |
| PAUSE | The PAUSE function stops and freezes the action on the screen at a single frame or unit |
| PLAY | Plays back previously recorded material |
| REPLAY | The REPLAY function plays programming from the INTERMEDIATE VIDEO SUPPLIER'S Video Buffer that was originally broadcast in the past. Allows SUBSCRIBERS to view, review or record previously aired programs |
| REVERSE | The REVERSE function backs the video image up and shows the action moving in reverse |
| RESTART | The RESTART function restarts the video from any point |
| SLOW MOTION | The SLOW MOTION function advances the video image at a reduced, variable speed |
| STEP | The STEP function advances the image one frame or unit at a time |
| FAST FORWARD | The FAST FORWARD function speeds up the video image and displays the action at an increased, variable speed |
| EDIT | The EDIT function allows SUBSCRIBERS to cut and paste and otherwise edit the video stored in the Video Scrapbook or to manipulate the table of pointers and indices into the Video Buffer to allow SUBSCRIBERS to manipulate and view the video in the Video Buffer as though it is stored in the Subscriber Video Scrapbook |
| STORE | The STORE function moves video from the Video Buffer to the Subscriber Video Scrapbook using the Video Scrapbook Index. This function frees up storage in the Video Buffer. |
| COPY | The COPY function moves video from the Subscriber Video Scrapbook to a SUBSCRIBER'S personal storage device at the SUBSCRIBER'S location. It may also move video from the Video Buffer using the Video Scrapbook Index. |
| SCHEDULE | Schedules recording in the future |
| MENU | Displays Available Services and Programs |
| DIR | Displays the Subscriber Directory to |

TABLE 1-continued

Components and Functions

| Component or Function | Description |
|---|---|
| | Subscriber Video Scrapbook, showing the programs the SUBSCRIBER has stored in the Subscriber Video Scrapbook |
| AUTH | Authorizes program delivery and agrees to pay for it |
| SELECT | Selects Channels and Programs to view or record |
| SEARCH | Searches archived programs for programs of interest |
| CANCEL | Cancels the current function and restores the system to its previous state |
| Local Control Unit | A Control Unit located at the SUBSCRIBER'S location that receives video programs and other information from the INTERMEDIATE VIDEO SUPPLIER and sends orders and commands from the SUBSCRIBER to the INTERMEDIATE VIDEO SUPPLIER, allowing The SUBSCRIBER to access all of the functions of the Subscriber Video Scrapbook |
| Local Video Buffer | Stores all of the programming received from VIDEO SUPPLIERS, Video Sources, Video-On-Demand Sources and/or INTERMEDIATE VIDEO SUPPLIERS in a local buffer at the SUBSCRIBER'S location. Programs are stored either in analog form, as a digitized version of the entire analog signal received by the Local Control Unit, or as a digitized version of the analog signal. By storing all of the programming as it is received, the Local Control Unit is able to manipulate it, RESTART it, make it available to SUBSCRIBERS immediately and again at a future time, and provide other functions of the present invention. |
| Remote Control | Allows SUBSCRIBERS to perform all of the Local Control Unit functions from a hand-held remote device. |
| Local Video Display | Displays television and other video programs at the SUBSCRIBER location |
| Local Video Recorder | Records television and other video programs at the SUBSCRIBER location |
| SUBSCRIBER ORDER OR COMMAND | Directs the INTERMEDIATE VIDEO SUPPLIER'S Video Server or Local Control Unit to perform system functions |
| Subscriber Order Database | Stores Subscriber Orders for access by the Video Server. Provides a basis for making royalty payments to content copyright holders. |
| Subscriber Database | Stores business and usage Information about SUBSCRIBERS to support billing and royalty payments |
| Programming Database | A Database of Available Programs, both past and future that can be accessed by SUBSCRIBERS |
| EVENT | A television program or other scheduled offering |
| Services Database | A Database of Available Services that can be subscribed to by INTERMEDIATE VIDEO SUPPLIER SUBSCRIBERS |
| Program Archive | Archive of previously broadcast programs |
| Program Archive Index | Index into the Program Archive |
| NETWORK CONNECTION(S) BETWEEN SUBSCRIBERS AND INTERMEDIATE VIDEO SUPPLIERS | Carries programs and control information back and forth between SUBSCRIBERS and INTERMEDIATE VIDEO SUPPLIERS |
| NETWORK CONNECTIONS BETWEEN VIDEO SUPPLIERS, Video Sources AND INTERMEDIATE VIDEO SUPPLIERS | Carries programs and control information Video back and forth between INTERMEDIATE VIDEO SUPPLIERS and VIDEO SUPPLIERS and Video Sources |
| LICENSE | An agreement between INTERMEDIATE VIDEO SUPPLIERS and original content providers and copyright holders that allows INTERMEDIATE VIDEO SUPPLIERS to provide the system services to SUBSCRIBERS, including RESTART, REPLAY, FAST FORWARD and RECORD |
| ADVERTISEMENTS | Short Advertisements that can be broadcast when SUBSCRIBERS RESTART, REPLAY or FAST FORWARD a program, or at other appropriate times |

The method and system of the present invention provides a unique and striking television viewing experience to CATV station, Satellite TV station, Global Computer Information Network site and other INTERMEDIATE VIDEO SUPPLIER SUBSCRIBERS. This system provides many advantages over traditional or proposed methodologies.

It will be apparent to those skilled in the art that various modifications and variations can be made in the system and processes of the present invention without departing from the spirit and scope of the invention. Thus, it is intended that the present invention cover all modifications and variations of the invention within the scope of the appended claims.

What is claimed is:

1. A method performed at an intermediate program supplier for providing broadcast programming to subscribers, the broadcast programming being received by the intermediate program supplier from one or more program suppliers and substantially simultaneously being broadcast to subscribers, the broadcast programming being associated with a first commercial advertisement broadcast with the broadcast programming, the method comprising:
recording the broadcast programming as it is broadcast to subscribers;
receiving a request from a subscriber to receive a given portion of recorded broadcast programming other than a portion then currently being broadcast to subscribers;
in response to the received request, inserting a second commercial advertisement in the recorded broadcast programming for presentation on a display device at the subscriber's location, wherein inserting the second commercial advertisement comprises replacing the first commercial advertisement with the second commercial advertisement in the recorded broadcast programming; and
transmitting the recorded broadcast programming and second commercial advertisement to the subscriber.

2. The method of claim 1, wherein receiving the request comprises receiving a request selected from the group consisting of fast forward, rewind, replay and restart.

3. The method of claim 2, wherein receiving a the request comprises receiving a request to fast forward through the first commercial advertisement, and wherein inserting the second commercial advertisement comprises inserting the second commercial advertisement for presentation on the display device while the subscriber fast forwards through the first commercial advertisement.

4. The method of claim 2, wherein receiving a the request comprises receiving a request to restart or replay a given program previously broadcast, and wherein inserting the second commercial advertisement comprises inserting the second commercial advertisement for presentation on the display device prior to the restart or replay of the given program.

5. The method of claim 1, wherein inserting a the second commercial advertisement comprises inserting the second commercial advertisement in the recorded broadcast programming in addition to the first commercial advertisement.

6. The method of claim 1, wherein the second commercial advertisement is not necessarily the same as the first commercial advertisement.

7. A method for providing access to a broadcast program, the method comprising:
  at a scheduled time, an intermediate video supplier receiving a video program from a video supplier and broadcasting the received video program to a plurality of subscribers with a set of first commercials;
  at or substantially at the scheduled time, the intermediate video supplier recording the received video program in one or more video buffers; and
  in response to a request from a given one of the plurality of subscribers for at least a portion of the recorded video program other than that then currently being broadcast to subscribers, the intermediate video supplier retrieving the recorded video program or a portion thereof from the one or more video buffers, replacing one or more first commercials from the set of first commercials with a second commercial within the retrieved video programming, and transmitting the retrieved video program or portion thereof to the given subscriber with the second commercial not selected from the set of first commercials.

8. The method of claim 7, wherein recording comprises recording the received video program regardless of having received a request to record the video program from any subscriber.

9. The method of claim 7, wherein transmitting comprises transmitting the second commercial in addition to the set of first commercials.

10. The method of claim 7, wherein transmitting the second commercial is based on the given subscriber's request.

11. The method of claim 10, wherein transmitting comprises transmitting the second commercial for display at the subscriber's location while the subscriber is fast forwarding through one or more commercials.

12. The method of claim 10, wherein transmitting comprises transmitting the second commercial for display at the subscriber's location prior to replaying or restarting the recorded video program.

13. A method for accessing a video program, the video program being recorded by an intermediate video supplier as it is received by the intermediate video supplier from a video supplier and broadcast to a plurality of subscribers with a set of first commercials presented with the video program on a display device at the subscriber's location, the method comprising:
  after the scheduled start time for broadcast of a video program, a first subscriber transmitting a request to the intermediate video supplier to access the video program or a portion thereof already broadcast by the intermediate video supplier; and
  in response to the request, the first subscriber receiving the video program or portion thereof from the intermediate video supplier with a second commercial not selected from the set of first commercials, the second commercial replacing one or more of the first commercials.

14. The method of claim 13, wherein transmitting a request comprises transmitting a request selected from the group consisting of fast forward, rewind, replay and restart.

15. The method of claim 14, wherein transmitting a request comprises transmitting a request to fast forward through a first commercial, and wherein receiving the second commercial comprises receiving the second commercial for presentation on the display device while the subscriber fast forwards through the first commercial.

16. The method of claim 14, wherein transmitting a request comprises transmitting a request to restart or replay the recorded video program, and wherein receiving the second commercial comprises receiving the second commercial for presentation on the display device prior to the restart or replay of the video program.

17. The method of claim 14, wherein receiving the second commercial comprises receiving the second commercial with the recorded video program in addition to one or more of the first commercials.

18. The method of claim 13, wherein the second commercial is a replacement for a single first commercial during a presentation of the recorded video program on the display device.

19. The method of claim 13, wherein the second commercial is a replacement for a plurality of first commercials during a presentation of the recorded video program on the display device.

20. The method of claim 19, wherein the second commercial is a replacement for the first commercials when the subscriber fast forwards through the first commercials.

21. A method for accessing a video program, the video program having been recorded during broadcast to subscribers at a scheduled time with a set of first commercials, the method comprising:
  using a local control unit, a subscriber requesting a function related to the recorded video program, the function being selected from the group consisting of fast forward, rewind, replay and restart; and in response to the subscriber's requested function, the local control unit performing the requested function and receiving the recorded video program with a second commercial not selected from the set of first commercials, the second commercial replacing one or more of the first commercials and displaying the recorded video program with the second commercial on a display device.

22. The method of claim 21, wherein the requested function is for a fast forward and wherein displaying the second commercial comprises displaying the second commercial while the fast forward function is being performed.

23. The method of claim 21, wherein the requested function is for a replay or restart of the recorded video, and wherein displaying the second commercial comprises displaying the second commercial prior to performing the replay or restart function.

24. A system comprising an intermediate video supplier for receiving data from and transmitting data to a subscriber location equipment comprising a local control unit, the system configured to:
  record a broadcast programming as it is broadcast to subscribers, the broadcast programming being associated with a first commercial advertisement broadcast with the broadcast programming;

receive a request from a subscriber for a given portion of recorded broadcast programming other than a portion then currently being broadcast to subscribers;

insert a second commercial advertisement in the recorded broadcast programming for presentation on a display device at the subscriber's location in response to the received request, wherein the second commercial advertisement replaces the first commercial advertisement with the second commercial advertisement in the recorded broadcast programming; and transmit the recorded broadcast programming and second commercial advertisement to the subscriber.

25. The system of claim 24, wherein receiving the request comprises receiving a request selected from the group consisting of fast forward, rewind, replay and restart.

26. The system of claim 25, wherein receiving the request comprises receiving a request to fast forward through the first commercial advertisement, and wherein inserting the second commercial advertisement comprises inserting the second commercial advertisement for presentation on the display device while the subscriber fast forwards through the first commercial advertisement.

27. The system of claim 25, wherein receiving a request comprises receiving a request to restart or replay a given program previously broadcast, and wherein inserting the second commercial advertisement comprises inserting the second commercial advertisement for presentation on the display device prior to the restart or replay of the given program.

28. The system of claim 24, wherein inserting a second commercial advertisement comprises inserting the second commercial advertisement in the recorded broadcast programming in addition to the first commercial advertisement.

29. The system of claim 24, wherein the second commercial advertisement not necessarily being the same as the first commercial advertisement.

30. A system for accessing a video program previously broadcast by an intermediate video supplier to a plurality of subscribers with a set of first commercials presented with the video program for display at the subscriber's location, the system comprising a video server coupled over a computer network to at least one local control unit, the video server configured to:

record the video program as it is being broadcast to the subscribers;

after the scheduled start time for broadcast of the video program previously broadcast by the intermediate video supplier, receive a request for at least a portion of the recorded video program other than that then currently being broadcast to subscribers from a first subscriber to access the video program or a portion thereof; and in response to the request, transmit to the first subscriber the video program or portion thereof with a second commercial not selected from the set of first commercials, the second commercial replacing one or more of the first commercials.

31. The system of claim 30, wherein the request from the first subscriber comprises a request selected from the group consisting of fast forward, rewind, replay and restart.

32. The system of claim 31, wherein the request from the first subscriber comprises a request to fast forward through a first commercial, and wherein the second commercial is transmitted to the first subscriber for display while the subscriber fast forwards through the first commercial.

33. The system of claim 31, wherein the request from the first subscriber comprises a request to restart or replay the video program, and wherein the second commercial is transmitted to the first subscriber for display prior to the restart or replay of the video program.

34. The system of claim 30, wherein the second commercial is a replacement for a single first commercial during a presentation of the recorded video program on a display device at the subscriber's location.

35. The system of claim 30, wherein the second commercial is a replacement for a plurality of first commercials during a presentation of the recorded video program on a display device at the subscriber's location.

36. The method of claim 35, wherein the second commercial is a replacement for the first commercials when the subscriber fast forwards through the first commercials.

37. A system for providing access to a broadcast program, the system comprising an intermediate video supplier coupled over a computer network to at least one local control unit, the system configured to:

at a scheduled time, receive a video program from a video supplier and broadcast the received video program to a plurality of subscribers with a set of first commercials;

at or substantially at the scheduled time, record the received video program in one or more video buffers; and in response to a request for at least a portion of the recorded video program other than that then currently being broadcast to subscribers from a given one of the plurality of subscribers, retrieve the recorded video program or a portion thereof from the one or more video buffers, replace one or more first commercials from the set of first commercials with a second commercial within the retrieved video programming, and transmit the retrieved video program or portion thereof to the given subscriber with the second commercial not selected from the set of first commercials.

38. The system of claim 37, wherein the received video program is recorded regardless of having received a request to record the video program from any subscriber.

39. The system of claim 37, wherein the second commercial is transmitted in addition to the set of first commercials.

40. The system of claim 37, wherein the second commercial is transmitted based on the given subscriber's request.

41. The method of claim 40, wherein transmitting comprises transmitting the second commercial for display at the subscriber's location while the subscriber is fast forwarding through one or more commercials.

42. The system of claim 40, wherein the second commercial is transmitted for display at the subscriber's location prior to replaying or restarting the recorded video program.

* * * * *